(12) United States Patent
Wiesner et al.

(10) Patent No.: US 11,180,616 B2
(45) Date of Patent: *Nov. 23, 2021

(54) FILMS DERIVED FROM TWO OR MORE CHEMICALLY DISTINCT BLOCK COPOLYMERS, METHODS OF MAKING SAME, AND USES THEREOF

(71) Applicant: Cornell University, Ithaca, NY (US)

(72) Inventors: Ulrich B. Wiesner, Ithaca, NY (US); Yuk Mun Li, Ithaca, NY (US); Qi Zhang, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/813,444

(22) Filed: Mar. 9, 2020

(65) Prior Publication Data

US 2020/0216618 A1 Jul. 9, 2020

Related U.S. Application Data

(62) Division of application No. 15/595,549, filed on May 15, 2017, now Pat. No. 10,584,215.

(60) Provisional application No. 62/336,071, filed on May 13, 2016.

(51) Int. Cl.
| | |
|---|---|
| *B01D 61/14* | (2006.01) |
| *B01D 67/00* | (2006.01) |
| *B01D 69/02* | (2006.01) |
| *B01D 71/28* | (2006.01) |
| *B01D 71/66* | (2006.01) |
| *B01D 71/80* | (2006.01) |
| *C08G 81/02* | (2006.01) |
| *B01D 69/14* | (2006.01) |
| *B32B 5/20* | (2006.01) |
| *B32B 5/32* | (2006.01) |
| *C08J 9/00* | (2006.01) |
| *C08J 9/28* | (2006.01) |
| *C08J 9/36* | (2006.01) |
| *B01D 71/26* | (2006.01) |
| *B01D 71/40* | (2006.01) |
| *C08L 53/00* | (2006.01) |

(52) U.S. Cl.
CPC ....... *C08G 81/024* (2013.01); *B01D 67/0013* (2013.01); *B01D 67/0079* (2013.01); *B01D 67/0093* (2013.01); *B01D 69/02* (2013.01); *B01D 69/14* (2013.01); *B01D 71/28* (2013.01); *B01D 71/66* (2013.01); *B01D 71/80* (2013.01); *B32B 5/20* (2013.01); *B32B 5/32* (2013.01); *C08J 9/0061* (2013.01); *C08J 9/28* (2013.01); *C08J 9/365* (2013.01); *B01D 61/145* (2013.01); *B01D 71/26* (2013.01); *B01D 71/40* (2013.01); *B01D 2323/36* (2013.01); *B01D 2325/022* (2013.01); *B01D 2325/04* (2013.01); *B32B 2250/02* (2013.01); *B32B 2250/22* (2013.01); *B32B 2266/025* (2013.01); *B32B 2266/0228* (2013.01); *B32B 2266/102* (2016.11); *B32B 2270/00* (2013.01); *B32B 2307/726* (2013.01); *B32B 2307/728* (2013.01); *B32B 2307/73* (2013.01); *C08J 2201/0502* (2013.01); *C08J 2201/0542* (2013.01); *C08J 2205/042* (2013.01); *C08J 2353/02* (2013.01); *C08J 2453/02* (2013.01); *C08L 53/00* (2013.01)

(58) Field of Classification Search
CPC ..... B01D 67/0079; B01D 69/02; B01D 71/80
See application file for complete search history.

(56) References Cited

U.S. PATENT DOCUMENTS

| | | | |
|---|---|---|---|
| 5,700,902 A | 12/1997 | Hancock et al. | |
| 2009/0239381 A1* | 9/2009 | Nishimi ............... | B05D 5/00 438/694 |

FOREIGN PATENT DOCUMENTS

WO WO-2015048244 A1 * 4/2015 ............. B01D 69/02

OTHER PUBLICATIONS

Radjabian, et al., Tailored Pore Sizes in Integral Asymmetric Membranes Formed by Blends of Block Copolymers, Advanced Materials, 2015, vol. 27, pp. 352-355.
Peinemann, et al.. Asymmetric superstructure formed in a block copolymer via phase separation, Nature, Nov. 4, 2007, vol. 6, pp. 992-996.

* cited by examiner

*Primary Examiner* — Bradley R Spies
(74) *Attorney, Agent, or Firm* — Johnson, Marcou, Isaacs & Nix LLC; Paul J. Roman, Jr.

(57) ABSTRACT

Methods of making blended, isoporous, asymmetric (graded) films (e.g. ultrafiltration membranes) comprising two or more chemically distinct block copolymers and blended, isoporous, asymmetric (graded) films (e.g. ultrafiltration membranes) comprising two or more chemically distinct block copolymers. The generation of blended membranes by mixing two chemically distinct block copolymers in the casting solution demonstrates a pathway to advanced asymmetric block copolymer derived films, which can be used as ultrafiltration membranes, in which different pore surface chemistries and associated functionalities can be integrated into a single membrane via standard membrane fabrication, i.e. without requiring laborious post-fabrication modification steps. The block copolymers may be diblock, triblock and/or multiblock mixes and some block copolymers in the mix may be functionally modified. Triblock copolymers comprising a reactive group (e.g., sulfhydryl group) terminated block and films comprising the triblock copolymers.

17 Claims, 18 Drawing Sheets

Before DMSO rinse

After DMSO rinse

FILMS DERIVED FROM TWO OR MORE CHEMICALLY DISTINCT BLOCK COPOLYMERS, METHODS OF MAKING SAME, AND USES THEREOF

CROSS REFERENCE TO RELATED APPLICATIONS

This application is a divisional of U.S. patent application Ser. No. 15/595,549, filed on May 15, 2017, which claims priority to U.S. Provisional Application No. 62/336,071, filed on May 13, 2016, the disclosures of each of which are hereby incorporated by reference.

STATEMENT REGARDING FEDERALLY SPONSORED RESEARCH

This invention was made with government support under contract no. HDTRA1-13-C-0003 awarded by the Defense Threat Reduction Agency. The government has certain rights in the invention.

FIELD OF THE DISCLOSURE

The disclosure generally relates to block copolymers and asymmetric porous films made from same. More particularly the disclosure generally relates to blends of block copolymers and asymmetric porous films made from same.

BACKGROUND OF THE DISCLOSURE

There has been growing interest in asymmetric ultrafiltration (UF) membranes derived from block copolymers since the first report by Peinemann et al. (Asymmetric superstructure formed in a block copolymer via phase separation. *Nat. Mater.* 2007, 6, 992-996.) resulting in isoporous membranes that combine a highly ordered surface structure with high permselectivity. The most widely studied polymer system fabricated to date with this block copolymer self-assembly and non-solvent induced phase separation (SNIPS) process is the diblock copolymer, poly(styrene-b-(4-vinyl)pyridine) (PS-b-P4VP, SV). The phase inversion technique was successfully applied to other diblock copolymer systems and triblock terpolymer systems.

Employing a second component in the casting dope solution, various membrane properties were tailored. For example, the morphology of the top surface layer was tuned by the addition of small organic molecules and metal ions, which form metal-polymer complexes. With the introduction of an additive that chemically interacts/swells one block of the block copolymer, pore sizes were tailored. For example, an organic additive, glycerol, was added to the ISV system in order to tailor the pore size moving the range of filtration from UF to nanofiltration. Pore sizes were also tailored in ISV terpolymer derived membranes by blending a homopolymer or in SV copolymer derived membranes by blending of other SV block copolymers with varied molar mass and block volume fractions. Finally, organic-inorganic hybrid membranes have been reported from the SNIPS process by mixing in sol- or other inorganic nanoparticles into the block copolymer dough, while carbon materials with asymmetric structure were derived from adding in resols and subsequent heat processing at elevated temperatures.

In order to design smarter membrane systems with tunable pore surface chemistry, it is desirable to use block copolymer architectures enabling attachment of foreign functional components, e.g. in a facile post-membrane-fabrication step. A critical challenge is the lack of effective incorporation methods. Several attempts have been made to achieve double-functionality through a binding layer, such as polydopamine, which enables other functional materials to adhere to membranes. This extrinsic binding layer, however, suffers from easy exfoliation during membrane usage. Also, the formation of a binding layer and its functionalization requires multiple post-processing steps. A co-assembly method to incorporate an inorganic component into the polymeric membranes was previously described, but this method only works when additives are compatible with organic solvents used for casting. Membranes with pores lined by acrylic acid moieties for which they anticipated further functionalization capabilities was previously described, again suggesting multiple post-membrane-fabrication steps. However, the use of acrylic acid as coupling sites was not demonstrated. Another challenge in this field is to expand on the diversity of chemistries present on the surface of the membrane pores. For example, it would be desirable to have membranes pores that simultaneously provide a stimulus response (e.g. pH dependent swelling and deswelling), binding sites for post-processing surface modifications, and hydrophilic groups to reduce fouling. To date most SNIPS derived membranes only provide a single pore surface functionality.

SUMMARY OF THE DISCLOSURE

In an aspect, the present disclosure provides methods of making blended isoporous graded films. The methods comprise mixing or blending of more than one chemically distinct block copolymer. Block copolymers include diblock copolymers and multiblock copolymers (e.g. triblock terpolymers). In an example, the present disclosure provides fabrication of novel, isoporous graded, mixed-triblock terpolymer-derived films. As shown herein mixed chemistries can result in performance profiles different from those of membranes obtained from either of the two constituting block copolymers alone.

In an example, a method for forming an blended film (e.g., an isoporous graded film of a mixture of block copolymer(s) and/or multiblock copolymer(s)) comprises: forming a film comprising a mixture of block copolymer(s) and/or multiblock copolymer(s) (e.g., block copolymer(s) and/or multiblock copolymer(s) each having at least one hydrophilic block, and, optionally, at least one hydrophobic block) on a substrate using a deposition solution comprising the mixture of multiblock copolymers and a solvent system; b) removing at least a portion of the solvent system (e.g., a solvent system comprising two or more solvents) from the film; and c) contacting the film from b) with a phase inversion solvent system, which results in formation of the isoporous graded film.

A variety of two or more chemically distinct block copolymers can be used in the mixture/blending solution. Use of modified block copolymers allows for post-modification of membranes with functionalizing molecules such as, for example, proteins, enzymes, nanoparticles and any other moiety that contains reactive functional groups that can be attached to the membrane via these functionalized groups. The block copolymers have at least one hydrophilic block. The block copolymers can have additional blocks that are hydrophobic blocks.

In an aspect, the present disclosure provides films. The films can be blended films. The films are isoporous graded films where isoporous refers to a homogeneous size distribution of pores in the surface separation layer (top surface layer of membrane).

In an example, the films are blended films. The blended films comprise at least two block copolymers. For example, a blended film comprising at least two chemically distinct block copolymers. In an example, the film comprises one or more triblock terpolymers of the present disclosure. The terpolymers can comprise one or more blocks having a reactive moiety. In an example, the triblock terpolymer comprises a block comprising a reactive group (e.g., a reactive group such as, for example, a terminal sulfhydryl group).

The film can comprise various functionalizing molecules. Examples of functionalizing molecules include, but are not limited to, dyes, metal chelators, peptides, antibody fragments, single strand DNA or RNA fragments, enzymes, proteins, polymers, DNA, RNA and the like. In an example, one or more functionalizing molecules, which may be the same or different, are covalently attached to at least a portion of the film (e.g., at least a portion of a pore surface).

In an example, the film is a hybrid film. The hybrid film further comprises a homopolymer or small molecule additive.

In an example, the film further comprises an inorganic material. The inorganic material is disposed on at least a portion of the film (e.g., the top, self-assembled surface layer surface, pore surface of the surface layer, and pore surface of the graded substructure).

In an aspect, the present disclosure provides uses of films of the present disclosure. The films can be used in filtration applications (e.g., chemical/biological molecule separations, and water purification), drug delivery, and molecular sensing. The present disclosure also provides devices. The devices comprise at least one blended film and/or at least one isoporous film of the present disclosure.

BRIEF DESCRIPTION OF THE FIGURES

For a fuller understanding of the nature and objects of the disclosure, reference should be made to the following detailed description taken in conjunction with the accompanying figures.

DETAILED DESCRIPTION OF THE DISCLOSURE

Figure 1:
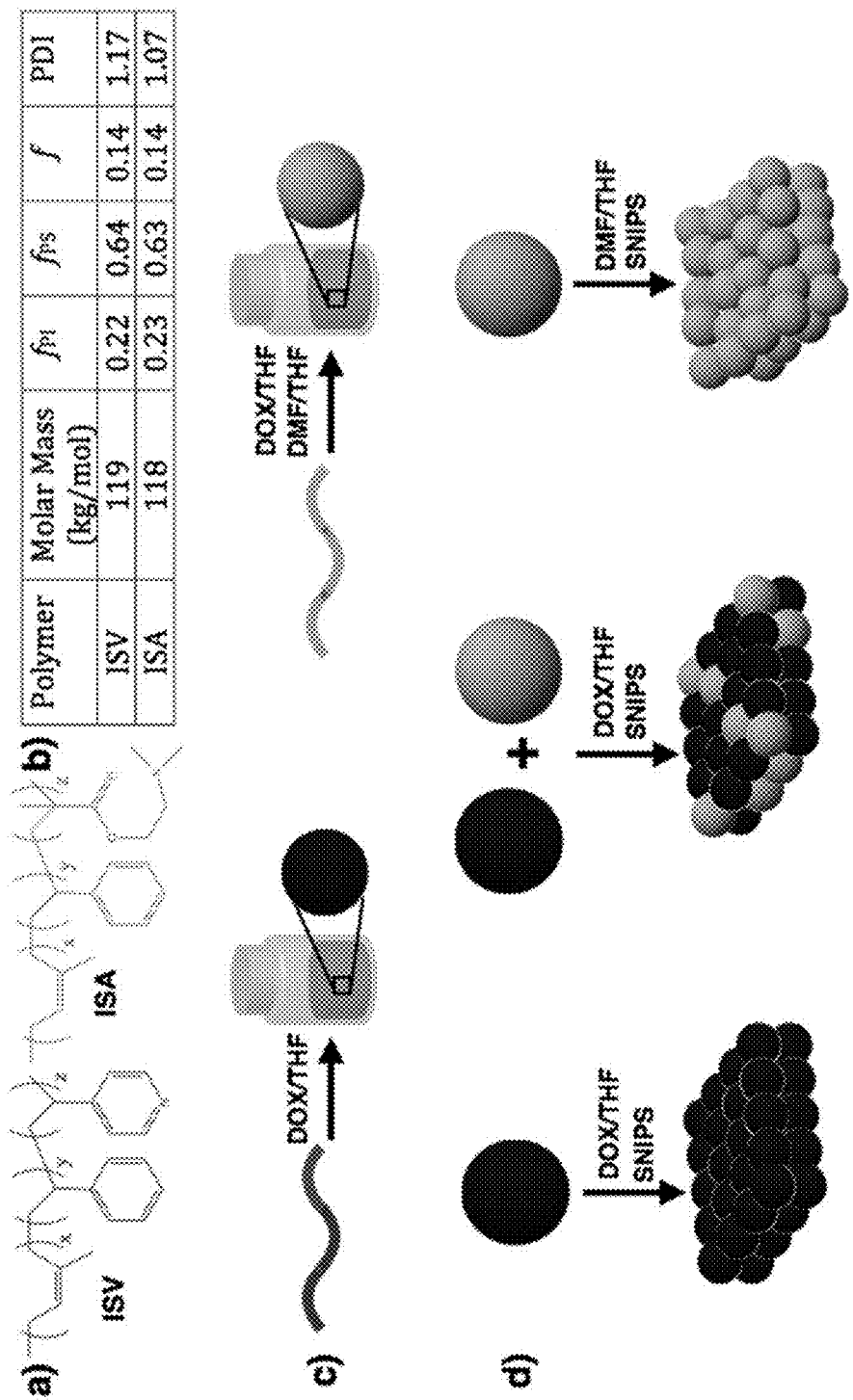
FIG. 1 shows pure and blended mesoporous membranes derived from poly(isoprene-b-styrene-b-(4-vinyl)pyridine) (ISV) and poly(isoprene-b-styrene-b-(dimethylamino)ethyl methacrylate) (ISA) triblock terpolymers. a) Chemical structures of ISV and ISA. b) Table displaying molar mass, volume fractions (f), and polydispersity index (PDI) of the two terpolymers. c) Terpolymers and their respective solvent systems. d) Schematic of formation of pure and blended membranes casted by block copolymer self-assembly and non-solvent induced phase separation (SNIPS) process. For simplicity, ISV and ISA are indicated as blue and green spheres, respectively, to visualize the compositional variations within the membrane. The true distribution of the terpolymers in the membrane is currently unknown.

Although claimed subject matter will be described in terms of certain embodiments and examples, other embodiments and examples, including embodiments and examples that do not provide all of the benefits and features set forth herein, are also within the scope of this disclosure. Various structural, logical, process step, and electronic changes may be made without departing from the scope of the disclosure.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

The present disclosure provides methods of making blended, isoporous, asymmetric (graded) films (e.g. ultrafiltration membranes) comprising two or more chemically distinct block copolymers and blended, isoporous, asymmetric (graded) films (e.g. ultrafiltration membranes) comprising two or more chemically distinct block copolymers. The present disclosure also provides triblock copolymers and films comprising triblock copolymers. The present disclosure also provides uses of films of the present disclosure.

The present disclosure provides composition of matter and methods of making of isoporous films (e.g., ultrafiltration membranes) fabricated from a combination of block copolymer self-assembly and non-solvent induced phase separation (SA+NIPS=SNIPS). The SNIPS derived films are fabricated from chemically distinct block copolymers so that, for example, pore surface chemistries can be tailored via a "mix and match" approach, i.e. the simple blending of the corresponding individual block copolymers into the original polymer solution from which the membrane is cast.

In an aspect, the present disclosure provides methods of making isoporous graded films. The methods comprise mixing or blending of more than one chemically distinct block copolymer. Block copolymers include diblock copolymers and multiblock copolymers (e.g. triblock terpolymers). In an example, a deposition solution does not include two block copolymers or multiblock copolymers differing only in the ratios of blocks present in the individual block copolymers.

In an example, the present disclosure provides fabrication of novel, isoporous graded, mixed-triblock terpolymer-derived films. In an example, the present disclosure provides an isoporous graded film made by a method disclosed herein. In an example, the mix can contain more than one distinct block copolymer, such as two different block copolymers, three different block copolymers or four or more different block copolymers. The block copolymers can be diblock copolymers, multiblock copolymers (e.g. triblock terpolymers), and mixtures thereof. In an example, some of the block copolymers can be functionalized prior to the mixing/blending step.

In an example, a method for forming a blended film (e.g., an isoporous graded film of a mixture of block copolymer(s) and/or multiblock copolymer(s)) comprises: forming a film comprising a mixture of block copolymer(s) and/or multiblock copolymer(s) (e.g., block copolymer(s) and/or multiblock copolymer(s) each having at least one hydrophilic block, and, optionally, at least one hydrophobic block) on a substrate using a deposition solution comprising the mixture of multiblock copolymers and a solvent system (e.g., a solvent system comprising two or more solvents); b) removing at least a portion of the solvent system from the film; and c) contacting the film from b) with a phase inversion solvent system, which results in formation of the isoporous graded film.

Any substrate on which a layer comprising a mixture of multiblock copolymers can be formed can be used. A wide range of substrate materials, sizes, and shapes can be used. The substrate can be solid or porous. Examples of suitable substrates include, but are not limited to, glass plates or rods, silicon, plastic (e.g., Teflon) porous membrane supports such as non-woven polyester, or any combination of the above. For example, non-woven polyester on top of glass can be used as a substrate. It may be desirable (e.g. to provide desirable mechanical stability of the films) to cast the films onto a (e.g. non-woven) support.

A variety of two or more chemically distinct block copolymers can be used in the mixture/blending solution. By "chemically distinct" it is meant that at least one of the blocks in a chemically distinct block copolymer has a different chemical composition than those in the other chemically distinct block copolymer(s). In an example, each of the chemically distinct block copolymer(s) and/or multiblock copolymers has a block that has a different chemical composition than those in the other chemically distinct block copolymer(s) and/or multiblock copolymers. Chemically distinct block copolymer(s) and/or multiblock copolymers can be made using one or more different monomers. Chemically distinct block copolymer(s) and/or multiblock copolymers are not only different in the molar mass of one or more block. For example, an A-B block copolymer is chemically distinct from an A-C block copolymer.

For example, each block copolymer can be a diblock copolymer, triblock copolymer, and/or higher order multiblock copolymer. In various examples, a multiblock copolymer is a triblock terpolymer having a structure of the form A-B-C, or A-C-B, or other variable arrangements or containing blocks of different chemical composition. In other examples, additional structures are higher order multi-block copolymer systems of the form A-B-C-B, or A-B-C-D, or A-B-C-B-A, or A-B-C-D-E, or other variable arrangements of these higher order systems. The block copolymers can be synthesized by methods known in the art. For example, the copolymers can be synthesized using anionic polymerization, atom transfer radical polymerization (ATRP), or other suitable polymerization techniques. The block copolymers can also be obtained commercially.

In an example, the two mixed or blended block copolymers are all triblock terpolymers. In other examples, one or more of the block copolymers is a diblock and/or a multi (>2) block copolymer.

In an example, the two mixed or blended block copolymers can contain two identical blocks, varying in only one block, such as for example A-B-C and A-B-D. In an example, A-B-C and A-B-D could be represented by poly (isoprene-b-styrene-b-(4-vinyl)pyridine) (ISV) and poly (isoprene-b-styrene-b-(dimethylamino)ethyl methacrylate) (ISA). In addition, the block polymers could be chosen so that the different blocks (e.g., C or D, or in one specific instance (4-vinyl)pyridine and (dimethylamino)ethyl methacrylate), as demonstrated in the Examples, wind up on the surface of the pore. The ratio of the C and D in the pore can be varied by varying the initial concentration of the A-B-C and A-B-D triblock terpolymers in the solution. In an example, the two mixed or blended block copolymers can be A-B-C and B-D, where C and D end up on the surface of the pore.

In an example, some of the end blocks of block copolymers can be functionalized with functional groups such as, for example, sulfhydryl (also referred to herein as thiol groups), amines, or carboxylic groups to produce mesoporous films with post-modification property on the pore walls. As an illustrative example, one can mix block copolymers A-B-C and A-B-C' where C' represents a polymer containing a functionally modified end group and C is the same polymer without a functionally modified end group. The percent of A-B-C' in the mixture can range from 0.1% up to 99.9% and any percent therebetween.

In another example, a functionalized multiblock copolymer includes poly(styrene)-b-poly(4-vinylpyridine)-b-poly (propylene sulfide) (SVPS).

In another example, the mixture or blend may comprise A-B-C, A-B-C' and A-B-D or any other combination of diblock copolymer(s), triblock copolymer(s) or larger multiblock copolymers, modified or unmodified.

The use of these modified block copolymers allows for post-modification of membranes with proteins, enzymes, nanoparticles and any other moiety that contains reactive functional groups that can be attached to the membrane via these functionalized groups.

The polymer blocks can have a broad molecular weight range. For example, blocks having a number averaged molar mass (Mn) of from $1\times10^3$ to $1\times10^6$ g/mol, including all values to the 10 g/mol and ranges therebetween.

The block and multiblock copolymers have at least one hydrophilic block. The hydrophilic blocks are disposed on pore walls of the film. In an example, at least a portion of the polymer chain of a hydrophilic block is disposed on at least a portion of an exterior surface (e.g., an exterior pore surface) of the film. The hydrophilic block can self assemble with another chemically distinct polymer block of a multi-block copolymer (e.g., a hydrophobic block). The hydrophilic block can have an acceptor group or donor group that can participate in intramolecular hydrogen bonding. Examples of suitable hydrophilic blocks include poly ((4-vinyl)pyridine), poly((2-vinyl) pyridine), poly(ethylene oxide), poly(dimethylethyl amino ethyl methacrylate), poly (acrylic acid), and poly(hydroxystyrene). In an example, the hydrophilic block is poly((4-vinyl)pyridine).

The block and multiblock can have additional blocks that are hydrophobic blocks. The hydrophobic blocks form the matrix of the film. For example, the block copolymers can have one or two hydrophobic blocks in addition to the hydrophilic block(s). Examples of suitable hydrophobic blocks include, but are not limited to, poly(styrenes) such as poly(styrene) and poly(alpha-methyl styrene), polyethylene, polypropylene, polyvinyl chloride, polytetrafluoroethylene, and poly(methacrylates) such as poly(methacrylate), poly (methyl methacrylate).

In an example, at least one of the additional hydrophobic blocks is a low glass transition temperature (Tg) block. By low Tg block it is meant that the block has a T g of 25° C. or less. The multiblock can have multiple low Tg blocks. Examples of suitable low Tg blocks include, but are not limited to, poly(isoprene), poly(butadiene), poly(butylene), and poly (isobutylene). In an example, the multiblock copolymer comprises a low Tg polymer block, a poly(styrene) block, and a poly((4-vinyl) pyridine) block.

Examples of suitable diblock copolymers include, but are not limited to, poly(styrene)-b-poly(4-vinylpyridine), poly (styrene)-b-poly(2-vinylpyridine), poly(styrene)-b-poly(ethylene oxide), poly(styrene)-b-poly(acrylic acid), poly(styrene)-b-poly(dimethyl amino ethyl methacrylate), poly (styrene)-b-poly(hydroxystyrene), poly(a-methyl styrene)-b-poly(4-vinylpyridine), poly(a-methyl styrene)-b-poly(2-vinylpyridine), poly(a-methyl styrene)-b-poly(ethylene oxide), poly(a-methyl styrene)-b-poly(acrylic acid), poly(a-methyl styrene)-b-poly(dimethy amino ethyl methacrylate), poly(a-methyl styrene)-b-poly(hydroxystyrene), poly(methylmethacrylate)-b-poly(4-vinylpyridine), poly(methylmethacrylate)-b-poly(2-vinylpyridine), poly(methylmethacrylate)-b-poly(ethylene oxide), poly(methylmethacrylate)-b-poly(acrylic acid), poly(methylmethacrylate)-b-poly (dimethyl ethyl aminoethyl methacrylate), poly (methylmethacrylate)-b-poly(hydroxystyrene).

Examples of suitable triblock terpolymers include, but are not limited to, poly(isoprene)-b-poly(styrene)-b-poly(4-vinylpyridine), poly(isoprene)-b-poly(styrene)-b-poly(2-vinylpyridine), poly(isoprene)-b-poly(styrene)-b-poly(ethylene oxide), poly(isoprene)-b-poly(styrene)-b-poly(acrylic acid), poly(isoprene)-b-poly(styrene)-b-poly(dimethylethyl amino ethyl methacrylate), poly(isoprene)-b-poly(styrene)-b-poly(hydroxystyrene), poly(isoprene)-b-poly(a-methyl styrene)-b-poly(4-vinylpyridine), poly(isoprene)-b-poly(a-methyl styrene)-b-poly(2-vinylpyridine), poly(isoprene)-b-poly(a-methyl styrene)-b-poly(ethylene oxide), poly(isoprene)-b-poly(a-methyl styrene)-b-poly(acrylic acid), poly(isoprene)-b-poly(a-methyl styrene)-b-poly(dimethyl amino ethyl methacrylate), poly(butadiene)-b-poly(styrene)-b-poly(4-vinylpyridine), poly(butadiene)-b-poly (styrene)-b-poly(2-vinylpyridine), poly(butadiene)-b-poly(styrene)-b-poly(ethylene oxide), poly(butadiene)-b-poly(styrene)-b-poly(acrylic acid), poly(butadiene)-b-poly(styrene)-b-poly(dimethyl amino ethyl methacrylate), poly(butadiene)-b-poly(styrene)-b-poly(hydroxystyrene), poly(butadiene)-b-poly(a-methyl styrene)-b-poly(4-vinylpyridine), poly(butadiene)-b-poly(a-methyl styrene)-b-poly(2-vinylpyridine), poly(butadiene)-b-poly(a-methyl styrene)-b-poly(ethylene oxide), poly(butadiene)-b-poly(a-methyl styrene)-b-poly(acrylic acid), poly(butadiene)-b-poly(a-methyl styrene)-b-poly(dimethyl amino ethyl methacrylate), poly(butadiene)-b-poly(styrene)-b-poly(hydroxystyrene), poly(isoprene)-b-poly(methylmetacrylate)-b-poly(4-vinylpyridine), poly(isoprene)-b-poly(methylmetacrylate)-b-poly(2-vinylpyridine), poly(isoprene)-b-poly(methylmetacrylate)-b-poly(ethylene oxide), poly(isoprene)-b-poly(methylmetacrylate)-b-poly(acrylic acid), poly(isoprene)-b-poly(methylmetacrylate)-b-poly(dimethylethyl amino ethyl methacrylate), poly(isoprene)-b-poly(methylmethacrylate)-b-poly(methylmethacrylate), poly(isoprene)-b-poly(methylmethacrylate)-b-poly(4-vinylpyridine), poly(isoprene)-b-poly(methylmethacrylate)-b-poly(2-vinylpyridine), poly(isoprene)-b-poly(methylmethacrylate)-b-poly(ethylene oxide), poly(isoprene)-b-poly(methylmethacrylate)-b-poly(acrylic acid), poly(isoprene)-b-poly(methylmethacrylate)-b-poly(dimethyl amino ethyl methacrylate), poly(butadiene)-b-poly(methylmethacrylate)-b-poly(4-vinylpyridine), poly(butadiene)-b-poly (methylmethacrylate)-b-poly(2-vinylpyridine), poly(butadiene)-b-poly(methylmethacrylate)-b-poly(ethylene oxide), poly(butadiene)-b-poly(methylmethacrylate)-b-poly(acrylic acid), poly(butadiene)-b-poly (methylmethacrylate)-b-poly(dimethyl amino ethyl methacrylate), poly(butadiene)-b-poly(methylmethacrylate)-b-poly(hydroxystyrene), poly(butadiene)-b-poly(a-methyl styrene)-b-poly(4-vinylpyridine), poly(butadiene)-b-poly(methylmethacrylate)-b-poly(2-vinylpyridine), poly (butadiene)-b-poly(methylmethacrylate)-b-poly(ethylene oxide), poly(butadiene)-b-poly(methylmethacrylate)-b-poly(acrylic acid), poly(butadiene)-b-poly(methylmethacrylate)-b-poly(dimethyl amino ethyl methacrylate), and poly(butadiene)-b-poly(methylmethacrylate)-b-poly(hydroxystyrene).

The total molar mass of the block and multiblock copolymers are such that the block or multiblock copolymers undergo self-assembly (i.e., microphase separation). It is desirable that defect free surfaces are formed upon meso- and macro-porous structure formation. For example, the total molar mass of the block or multiblock copolymer is from $5\times10^3$ to $5\times10^5$ g/mol, including all values to the 10 g/mol and ranges there between.

Block and multiblock copolymers can have a range of polydispersities (Mw/Mn). For example, one or more or all of the block and/or multiblock copolymers have a polydispersity index (PDI) of 1.0 to 2.0, including all values to the 0.1 and ranges there between.

The fabrication of blended membranes through the concept of mixing distinctive block copolymers in the casting solution demonstrates the progression towards cutting-edge and state-of-the-art asymmetric block copolymer derived membranes by the facile, industrially proven NIPS process. The mixing method can be applied to blends involving combinations of homopolymer, diblock, triblock, and higher multi-block copolymers. The synthetic nature of block copolymers enables the design of molecular architecture, size, volume fraction of constituent blocks, morphology, chemical composition, and functionality. Tunability of membrane pore size has been shown and thus pore-to-pore distance, pore density and rejection profiles, through molar mass.

An additional mixed performance profile can be obtained through the blending of block copolymers with distinct chemical functional groups residing at the end of the block disposed on pore walls. The presence of specific chemical groups in the membrane can be tailored through the adjustment of block copolymer ratios in the casting solution. Incorporating various other chemical functional groups into the block copolymer (i.e. hydroxyl, carbonyl, carboxyl, amino, sulfhydryl, phosphate, etc.), these functional group can be incorporated into the pore surfaces of membranes, so novel "smart" materials comprising several different properties (i.e. chemical, physical, and/or biological stimuli responsive) can be developed.

By blending a combination of different block copolymers, we have the ability to design mono-, bi-, or multi-functional ultrafiltration membranes and superstructures that are tunable over a broad range of parameters (mentioned above) via standard membrane fabrication without post-modification steps of the formed membrane and the need to synthesize new, pristine, complex polymers. Additionally, membranes can be embedded with a blend of (i.e. nanoparticles, enzymes) which covalently attach to the respective functional group.

Furthermore, the resultant blended block copolymer superstructures can be used as templates for the fabrication of blended functional materials after subsequent heat processing. The generation of blended membranes by mixing two chemically distinct triblock terpolymers in the casting solution demonstrates a pathway to advanced asymmetric block copolymer derived ultrafiltration membranes in which different pore surface chemistries and associated functionalities can be integrated into a single membrane via standard membrane fabrication, i.e. without requiring laborious post-fabrication modification steps.

Blending is not limited to ABC with ABD triblock terpolymers. For example an AB diblock copolymer can be mixed with an AC copolymer, where the two end blocks, B and C, together end up on the surface of the pores.

This may also be of interest in cases where blocks ending up on the surface of the pores carry specific functional groups, may it be on each monomer, or may it be at specific positions along the chain, e.g. the chain ends. For example an AB diblock copolymer could be mixed with an AB' diblock copolymer, where the prime represents an end functional group at the terminal end of the B block, e.g. an amine ($-NH_2$), thiol ($-SH$), carboxyl ($-COOH$), or hydroxyl group ($-OH$). Another example would be an ABC triblock terpolymer is mixed with an ABC' triblock terpolymer.

Blending can further be extended to more than two diblock, triblock, or even tetrablock copolymers at a time.

This may be particularly advantageous when mixing in various block copolymers with different but specific end-functional groups, which would allow a "mixing and matching" approach to tailor the pore wall chemistries and functionalities. For example, one could mix AB with AB' and AB" block copolymers, or ABC with ABC' and ABC" triblock terpolymers, where primes and double-primes refer to different end-functional groups on the terminal position of the end blocks.

Other examples could be mixing AB with AB' and one or more distinct block copolymer; ABC with ABC' and one or more distinct block copolymer or any other mixture. Dependent on the chemistry, mixing of diblock and triblock copolymers could be accomplished, for example in the form of BC with ABC copolymers.

In various examples, one or more diblock and/or one or more triblock and/or one or more tetrablock, etc. copolymers can be "mixed and matched" with or without ISV and/or ISA.

As shown herein mixed chemistries can result in performance profiles different from those of membranes obtained from either of the two constituting block copolymers alone. This may have interesting implications for separation applications. For example, blending two or more distinct chemistries into the membrane surface may provide affinities to proteins that are different to those of membranes obtained from either of the two or more constituting block copolymers alone, and therefore may lead to improved selectivity. And the blending may not be confined to only unfunctionalized or only functionalized block copolymers but may be extended to multiple (i.e. more than two) chemically distinct block copolymers, with multiple distinct end functional groups, enabling to "mix and match" constituents, thereby tailoring membrane properties to specific needs.

In an example, at least one of the at least two structurally distinct multiblock copolymers is a triblock terpolymer. In another example, at least two of the at least two structurally distinct multiblock copolymers are triblock terpolymers.

In an example, one or more of the at least two structurally distinct multiblock copolymers is poly(isoprene-b-styrene-b-4-vinylpyridine) (ISV) and poly(isoprene-b-styrene-b-dimethyl amino ethyl methacrylate) (ISA), poly(isoprene-b-styrene-b-ethylene oxide) (ISO), poly(styrene-b-4-vinylpyridine-b-propylene sulfide) (SVPS) or a combination thereof.

In an example, the two structurally distinct multiblock copolymers are i) poly(isoprene-b-styrene-b-4-vinylpyridine) (ISV) and poly(isoprene-b-styrene-b-dimethylamino ethyl methacrylate) (ISA), ii) poly(isoprene-b-styrene-b-4-vinylpyridine) (ISV) and poly(isoprene-b-styrene-b-ethylene oxide) (ISO) or iii) poly(isoprene-b-styrene-b-4-vinylpyridine) (ISV), poly(styrene-b-4-vinylpyridine-b-propylene sulfide) (SVPS), and poly(isoprene-b-styrene-b-ethylene oxide) (ISO).

The block and multiblock copolymers can be mixed in various ratios. In an example, each block and/or multiblock polymer is present at 0.1 to 99.9% by weight, including all 0.1% by weight values and ranges therebetween. It is considered that a film has the same or substantially same amounts of each block and multiblock copolymer present in the deposition solution used to make the film.

A rationale for selecting the combinations is to choose block copolymers with the same hydrophobic block(s), e.g. PI and PS blocks, but different hydrophilic blocks, e.g., P4VP and PDMAEMA (as show in an example). This rationale is based on the desire to vary the surface chemistry of the pore walls, while keeping the wall chemistry itself the same. Specific hydrophilic blocks are then chosen based on the chemistries and associated functionalities that are wanted on the pore surface of the final blended membrane. For example, ISV and ISA were chosen due to their pH-responsive behavior. The blended membrane exhibited a mixed pH-responsive behavior. Another example is a blended membrane from ISV, ISO, and SVPS. The triblend membrane exhibited pH-responsiveness (from the P4VP block in ISV), increased hydrophilicity (from the PEO block in ISO), as well as the ability to covalently attach functionalizing molecules (from the PPS block in SVPS; note that in this latter case the hydrophobic block chemistry was changed from IS to S only, which suggests that such variations still work as the PS block is the more important block for constituting the rigid walls).

The block copolymer layer can be deposited by a variety of methods known in the art. Examples of suitable deposition methods include, but are not limited to, doctor blade coating, dip coating, flow coating, slot coating, slide coating, inkjet printing, screen printing, gravure (flexographic) printing, spray-coating, and knife coating. Additionally, films can be casted, for example, by hand (e.g., using an automated blade-casting machine) or employing roll-to-roll technology used in industry.

The deposition solution is used to form a film comprising the block copolymers on the substrate. The deposition solution comprises at least two block copolymers and a solvent system. The deposition solution can comprise of different solvents depending on the solubility of the mixed block copolymers, and depending on the miscibility with water in the phase inversion step. It is desirable that solvent(s) in the deposition solution have fast exchange with water.

It may be desirable that the solvent system include at least 1,4-dioxane (DOX) and tetrahydrofuran (THF). In various examples, the solvent system is DOX and THF or a mixture of solvents where at least two of the solvents in the mixture are DOX and THF. In various examples, the solvent system has at least 33% by weight or at least 50% by weight 1,4-dioxane. For example, a solvent system with 70/30 1,4-dioxane/tetrandryofuran by weight can be used. The solvent system can also include an additional solvent or solvents. In an example, a solvent system comprises DOX, THF, and acetonitrile (MeCN). In the case of a blended ISV/ISO system it was desirable to use a solvent system comprising DOX, THF, and acetonitrile.

Without intending to be bound by any particular theory, it is considered that use of 1,4-dioxane and tetrahydrofuran in the deposition solvent results in the desired orientation of self-assembled morphology of the surface layer of the film upon evaporation.

The concentration of the block copolymers in the deposition solution can be a factor in the structure of the resulting film. The concentration of block copolymer can be selected based on parameters such as the chemical composition and molar mass of the block copolymer and the deposition solvent(s). The polymer concentration of the casting solution can be, for example, 5 to 50% by weight, including all integer values of % by weight and ranges therebetween. Typical concentrations of the block copolymer in the deposition solution can be 5 to 30% by weight.

The films can be formed without using a metal salt. In an example, the deposition solution does not have a metal salt.

In an example, the methods can be used to produce hybrid block copolymer mesoporous films. The hybrid films are blends (e.g., blends of block copolymers with a homopolymer (or homopolymers) or small molecules (or mixtures of small molecules). Accordingly, the deposition solution can also include a homopolymer or a small molecule. Examples of suitable homopolymers and small molecules are provided herein.

At least a portion of the solvent(s) in the film is removed by allowing the as deposited film to stand for a period of time. The solvent evaporation period is a variable process and can take place over a wide range of times (e.g., from seconds to minutes) and determined and optimized for each mixing or blending of block copolymers. Not to be limiting, the evaporation time is dependent on, for example, the deposition solution composition such as the concentration of each block copolymer in the solution and the block copolymers used; as well as the solvent used.

After the partial solvent removal step, the film is contacted with a phase inversion solvent system. Phase inversion refers to a process in which a block copolymer film is contacted with (e.g., immersed into) a non-solvent of the block copolymer(s) leading to liquid-liquid phase separation and finally to the desired porous film. This is referred to herein as a NIPS (non-solvent induced phase separation) process. The solvent system can be a single solvent or a mixture of solvents. The solvent system is a non-solvent for the block copolymer(s) (e.g., at least one of the blocks of one or more of the block copolymer precipitates in the solvent system). Further, in the case where 1,4-dioxane is used in the deposition solution, 1,4-dioxane must be miscible with the non-solvent for the NIPS process. Examples of suitable solvents for use in the NIPS process include, but are not limited to, water, methanol, ethanol, acetone, and combinations thereof.

Without intending to be bound by any particular theory, it is considered that contacting the film with a non-solvent causes the polymer to precipitate. The asymmetric structure of the film due to the asymmetric distribution of the organic solvent(s) is therefore locked in due to vitrification of the polymer. This results in formation of a graded porosity in the film.

The films resulting from the method have an identifiable surface layer and an identifiable support layer. There is an identifiable transition layer between the surface layer and the support layer. The transition layer has a structure having characteristics of both the surface layer and the support layer. The surface layer, transition layer, and support layer form a continuous film. The surface layer of the film is away from the substrate and support layer of film is disposed on the substrate. The film can be removed from the substrate providing a free-standing porous film.

The film can be pore functionalized after film formation. In an example, a method of making a film comprising pores with reactive groups further comprises contacting the film with a functionalizing molecule with a functional group or moiety that can react with a reactive group in a pore, where the functionalizing molecule (or a portion thereof) is covalently bonded to the pore surface.

The methods can be carried out in various environments. In some instances, a desirable surface structure is obtained for films cast at a controlled humidity of about 40%.

In an aspect, the present disclosure provides films. The films are isoporous graded films where isoporous refers to a homogeneous size distribution of pores in the surface separation layer (top surface layer of membrane). The films can be blended films. Blended films can be made by methods of the present disclosure. In an example, a blended film is made by a method of the present disclosure.

Various methods of making isoporous graded films and block copolymers that form isoporous graded films are found in U.S. Pat. No. 9,527,041. The disclosure of methods of making isoporous graded films and block copolymers that form isoporous graded films in U.S. Pat. No. 9,527,041 is incorporated herein by reference.

In an example, the films are blended films. The blended films comprise at least two block copolymers. For example, a blended film comprising at least two structurally distinct block copolymers (e.g., at least two block copolymer(s) and/or multiblock copolymer(s)). The blended film can comprise at least two structurally distinct block copolymers (e.g., block copolymer(s) and/or multiblock copolymer(s)) where each having at least one hydrophilic block, and, optionally, at least one hydrophobic block. The film comprises: a surface layer having a thickness of 20 nm to 500 nm, a plurality of narrowly distributed pore sizes 5 nm to 100 nm in size, a pore density of at least $1 \times 10^{14}$ pores/m$^2$, and an asymmetric hierarchical substructure having a thickness of 5 microns to 500 microns, including all integer micron values and ranges therebetween, and pores having a size of 5 nm to 100 microns, including all integer micron values and ranges therebetween.

Blended membranes show well-defined mesoporous top surfaces atop a sponge- or finger-like substructure. Blended membranes comprising ISV and ISA that are majority ISV have square packed pores with diminished packing order as the ISV component decreases relative to ISA.

In an example, the film comprises one or more triblock terpolymers of the present disclosure. The terpolymers comprise one or more blocks having a reactive moiety. In example, the triblock terpolymer comprises a block comprising a terminal sulfhydryl group.

For example, an isoporous graded film comprising a triblock terpolymer of the present disclosure having a reactive group and the film comprises: a surface layer having a thickness of 20 nm to 500 nm, a plurality of narrowly distributed pore sizes 5 nm to 100 nm in size, a pore density of at least $1 \times 10^{14}$ pores/m$^2$, and an asymmetric hierarchical substructure having a thickness of 5 microns to 500 microns and pores having a size of 5 nm to 100 microns.

A film can comprise one or more block copolymers. Non-limiting examples of block copolymers and combinations of block copolymers are described herein.

In an example, an isoporous graded film comprises poly (styrene-b-4-vinylpyridine-b-propylene sulfide) (SVPS). The film can have a top surface characterized by hexagonally packed pores.

Films (e.g. isoporous graded films) comprising a triblock terpolymer of the present disclosure having a reactive group can have chains (e.g., poly(propylene sulfide) chains) residing within pore walls (e.g., at least a portion of the pore wall or all of the pore walls) that have reactive groups. The reactive groups are disposed such that they provide covalent binding (reactive) sites for functionalizing molecules.

A film can comprise various reactive groups. The reactive groups can be terminal reactive groups (e.g., covalently bonded to a terminus of a block of multiblock copolymer). Examples of reactive groups include, but are not limited to, sulfhydryl groups, amine groups, carboxylic acid groups, hydroxyl, carbonyl, azide, alkyne, alkene, and the like. The functionalization groups can be formed by post-film formation reactions (e.g., reactions with heterobifunctional molecules that react with a terminal thiol group in a pore of a polymer to provide a reactive group other than a thiol).

A film can have various amounts of reactive groups in pores of the film. In an example, the films have at least 1, at least 10, or at least 100 accessible reactive groups per surface block of the copolymer. In another example, the films have 1 to 10, 1 to 100, 5 to 100, or 10 to 100 accessible reactive groups per surface block of the copolymer.

A film can comprise various functionalizing molecules. These include low molar mass molecules (e.g. dyes, metal chelators, peptides, antibody fragments, single strand nucleic acid fragments such as, for example, single strand DNA or RNA fragments, and the like) or larger molar mass molecules (enzymes, proteins, polymers, nucleic acids such as, for example, DNA, RNA, and the like). In an example, one or more functionalizing molecules, which may be the same or different, are covalently attached to at least a portion of the film (e.g., at least a portion of a pore surface).

By "isoporous" it is meant that the surface layer of the films have a narrow pore size distribution. By "graded" it is meant that the film substructure has asymmetric porosity. Isoporous graded films can be made by the methods disclosed herein. A film can be disposed on a substrate or can be a free standing film.

Films can have a variety of shapes. One having skill in the art will appreciate that films having a variety of shapes can be fabricated. Films can have a broad range of sizes (e.g., film thicknesses and film area). For example, the films can have a thickness of from 5 microns to 500 microns, including all values to the micron and ranges therebetween. Depending on the application (e.g., bench-top applications, biopharmaceutical applications, and water purification applications, the films can have areas ranging from 10 s of $cm^2$ to 10 s (even 100 s) of $m^2$.)

Films can have desirable properties. For example, the films can have desirable mechanical properties (e.g., toughness) and permeability. The mechanical properties of the films can be tailored by use of selected block copolymers. For example, film toughness can be improved by using a low $T_g$ poly(isoprene) block in the block copolymer. In the case of isoporous graded films comprising triblock copolymers having a low $T_g$ block, the films can exhibit desirable toughness. For example, the films can have a toughness of greater than 5 $GJ/m^3$. For example, depending on the block copolymer used and structure of the film, the films can exhibit a hydraulic permeability of at least 300 $L\ m^{-2}\ hr^{-1}\ bar^{-1}$.

The structural and performance characteristics of the films can include both stimuli responsive permeation and separation. The parent (i.e., not including a homopolymer or small molecule) and hybrid films can be tuned in a manner so that transport of various liquids and dispersed solids can be controlled. For example, the pore size of the films can be turned (e.g., increased or decreased) by hybridization of the film by incorporating a homopolymer or a small molecule in the deposition solution or by exposing the film to a specific pH solution (e.g., the film is exposed to a feed solution having a desired pH after the SNIPS process).

An isoporous graded film has a surface layer (also referred to herein as a top layer) and a support layer. The surface layer can have a range of thicknesses. For example, the surface layer can have a thickness of from 20 nm to 500 nm, including all values to the nm and ranges therebetween. The surface layer has a plurality of pores extending thorough the depth of the surface layer. The pores can have morphologies such as cylindrical and cubic morphologies. The pores can have a size (e.g., diameter) of from 5 nm to 100 nm, including all values to the nm and ranges therebetween. The surface layer can have a range of pore densities. For example, the surface layer pore density can be from $1\times10^{14}$ pores/$m^2$ to $1\times10^{15}$ pores/$m^2$, including all values to the pores/$m^2$ and ranges therebetween. In an example, the density of the surface pores of a membrane as described herein is at least $10^{14}$ pores/$m^2$. The surface layer is isoporous. By "isoporous" it is meant that the pores have narrow pore size distribution. For example, a narrow pore size distribution is less than 0.3 (e.g., 0.1 to 0.3, including all values to 0.01 and ranges therebetween), where the pore size distribution is defined as the coefficient of variance, $\sigma/\mu$, obtained through a lognormal distribution fit. In various examples, the pore size distribution is 0.1, 0.15, 0.2, 0.25, or 0.3. For example, the film comprises a surface layer having vertically and horizontally aligned and nearly monodisperse mesopores. In an example, the isoporous surface layer has a pore density of at least $1\times10^{14}$ pores/$m^2$ and a pore size distribution of less than 0.3.

Without intending to be bound by any particular theory, it is considered that the morphology of the surface layer is, in part, a result of the self-assembly of the multiblock copolymer(s) The morphology of this layer is dependent on the casting conditions (e.g., flow rate of environment around the film, water (humidity)/solvent concentration in environment around the film, evaporation time, casting speed, gate height) as well as the composition of the casting solution (e.g., polymer molar mass, chemistry, concentration, casting solvent or mixture of solvents).

The support layer is disposed between the surface layer and the substrate where the film is disposed on the substrate. This layer is a supporting sub-structure layer. The support layer can have a range of thicknesses. For example, the thickness of the bulk layer can be from 5 microns to 500 microns, including all values to the micron and ranges therebetween. The pores in the support layer can be from 10 nm to 100 microns in size (e.g., diameter), including all values to the nm and ranges therebetween. The support layer has an asymmetric structure. For example, the layer can have a sponge-like or finger-like structure. Moving from the top of this layer (e.g., the part in contact with the surface layer) to the bottom of the layer (e.g., the free surface or surface in contact with the substrate), the pores increase in size. For example, the bulk layer can have pores having a size of 10 nm at the top of the support layer (layer in contact with the surface layer) and the pores increase in size to 100 μm at the bottom of the support layer. The increase in pore size moving though the depth of the film (e.g., from the top of the support layer in contact with the surface layer to the surface of the film in contact with the substrate) provides an asymmetric structure. This support layer is formed as a result of contacting (e.g., immersing) the film into a non-solvent bath (e.g., water in the NIPS process).

In an example, a film is a hybrid film. A hybrid film further comprises a homopolymer or small molecule additive. The homopolymer or small molecule is blended in the multiblock copolymer. The homopolymer or small molecule can be blended in (i.e., mixed with) the hydrophilic block or hydrophobic block of the multiblock copolymer. The homopolymer or small molecule preferentially associates with one of the blocks of the multiblock copolymer and locates in the vicinity of that block. For example, poly (phenylene oxide) can mix with a poly(styrene) block of a multiblock copolymer. For example, poly(isoprene) can mix with a poly(isoprene) block of a multiblock copolymer. Hybrid films can be prepared as described herein.

Any homopolymer that has the same chemical composition as or can hydrogen bond to at least one block (e.g., the hydrophilic block) of the multiblock copolymer can be used. The homopolymer can have hydrogen bond donors or hydrogen bond acceptors. Examples of suitable homopolymers include, but are not limited to, poly(4-vinylpyridine), poly(acrylic acid), and poly(hydroxy styrene). It is desirable that the homopolymers or small molecules have a low or negative chi parameter with the hydrophilic block (e.g., poly(4-vinylpyridine). A range of ratios of multiblock copolymer to homopolymer can be used. For example, the molar ratio of multiblock copolymer to homopolymer can be from 1:0.05 to 1:10, including all ranges therebetween. The homopolymer can have a range of molar mass. For example, the homopolymer can have a molar mass of from $5 \times 10^2$ g/mol to $5 \times 10^4$ g/mol.

Any small molecule that can hydrogen bond to at least one block of the multiblock copolymer can be used. The small molecule can have hydrogen bond donors or hydrogen bond acceptors. Examples of suitable small molecules include, but are not limited to, glycerol, pentadecyl phenol, dodecyl phenol, 2-4'-(hydroxybenzeneazo)benzoic acid (HABA), 1,8-naphthalene-dimethanol, 3-hydroxy-2-naphthoic acid, and 6-hydroxy-2-naphthoic acid. A range of ratios of multiblock copolymer to small molecule can be used. For example, the molar ratio of multiblock copolymer to small molecule can be from 1:1 to 1:1000, including all integer ratios therebetween.

In an example, the film further comprises an inorganic material. The inorganic material is disposed on at least a portion of the film (e.g., the top, self-assembled surface layer surface, pore surface of the surface layer, and pore surface of the graded substructure). For example, the inorganic material can be in the form of nanoparticles. The nanoparticles can be, for example, 1 to 200 nm, including all values to the nanometer and ranges therebetween, in diameter. Examples of suitable inorganic materials include, but are not limited to, metals, metal oxides (e.g., silver oxide and copper oxide) and semiconductors (e.g., semiconducting nanoparticles such as CdS nanoparticles). For example, the inorganic material can be disposed on at least 50%, at least 60%, at least 70%, at least 80%, at least 90%, at least 95%, at least 99% of the surfaces of the film. In an example, the inorganic material is disposed on 100% of the surfaces of the film.

For example, the film further comprises a plurality of metal nanoparticles. The inorganic metal nanoparticles are disposed on at least a portion of the film (e.g., the top, self-assembled surface layer surface, pore surface of the surface layer, and pore surface of the graded substructure). The nanoparticles can complex (e.g., through weak intramolecular forces) with the multiblock copolymer of the film surface. The nanoparticles can be, for example, 1 to 200 nm, including all values to the nanometer and ranges therebetween, in diameter. Examples of suitable metals for the metal nanoparticles include, but are not limited to, gold, silver, platinum, palladium, cobalt, copper, nickel, iron, zinc, chromium, ruthenium, titanium, zirconium, molybdenum, aluminum, and cadmium. The nanoparticles can be mixtures of different nanoparticles. For example, the metal nanoparticles can be disposed on at least 50%, at least 60%, at least 70%, at least 80%, at least 90%, at least 95%, at least 99% of the surfaces of the film. In an example, the metal nanoparticles are disposed on 100% of the surfaces of the film. Films with silver nanoparticles can exhibit antimicrobial behavior.

The inorganic materials can be deposited on the film by methods known in the art. For example, the inorganic material can be deposited by electroless deposition methods.

In an aspect, the present disclosure provides triblock terpolymers comprising one or more blocks having a reactive moiety. In various examples, triblock terpolymers comprises one or more blocks having a reactive moiety and a hydrophilic block and/or a hydrophobic block. Examples of hydrophilic blocks and hydrophobic blocks are provided herein. Triblock terpolymers comprising a block having a reactive moiety can be made by methods provided herein.

Attachment of foreign functional components (e.g., functionalizing molecules) to block copolymer membranes allows design of more dynamic membrane systems prepared from block copolymer architectures. A solution to the challenge of attachment of foreign functional components to block copolymer membranes is achieved by designing a block copolymer that is responsive and has covalent binding capabilities. To that end, block copolymers can be synthesized with end functionality group, such as inclusion of a small poly(propylene sulfide) (PPS) fraction to the end of a block. For example, terminal sulfhydryl groups were introduced when the block was terminated by a proton donor during anionic polymerization. The end PPS block provides thiol functional groups for covalent bonding via, for example, thiol-ene click chemistry. This reaction is versatile towards numerous biomolecules and results in strong covalent bonds, offering a versatile platform for foreign molecule attachment.

A block copolymer comprising terminal reactive groups (e.g., sulfhydryl groups) can be processed into an asymmetric films and membranes using the scalable nonsolvent induced phase separation (SNIPS) process techniques, for example, as disclosed herein. After membrane formation, the reactive groups (e.g., thiol groups) remain active and that the reactive functional groups are exposed and accessible on the pore walls and/or membrane surfaces and that target molecules can attach to the membranes via these reactive functional groups, via for example known conjugation strategies. In an example, the conjugation strategy is click chemistry (e.g., thiol-ene click chemistry).

Functional groups including, for example, sulfhydryl groups, amine groups, carboxylic acid groups, hydroxyl, carbonyl, azide, alkyne, alkene can also be covalently attached to the end group/block of block copolymers via techniques such as, for example, anionic polymerization, that are subsequently used in the SNIPS process such that the functional groups end up on the pore surface of the top separation layer as well as the substructure.

The triblock terpolymer can comprise various reactive groups. The reactive groups can be terminal reactive groups (e.g., covalently bonded to a terminus of a block of multiblock copolymer). Examples of reactive groups include, but are not limited to, sulfhydryl groups, amine groups, carboxylic acid groups, hydroxyl, carbonyl, azide, alkyne, alkene, and the like. The reactive groups can be formed by post-film formation reactions (e.g., reactions with heterobifunctional molecules that react with a terminal thiol group in a pore of a polymer to provide a reactive group other than a thiol).

In example, the triblock terpolymer comprises a block comprising a terminal sulfhydryl group. In example, the triblock terpolymer comprises a block comprising a terminal sulfhydryl group and a hydrophilic block and/or a hydrophobic block.

In an example, a triblock terpolymer comprise a short poly(propylene sulfide) block (e.g., a poly(propylene sulfide) block) having a molar mass (Mw and/or Mn) of 74 g/mol to 7,000 g/mol, including all integer g/mol values and ranges therebetween, that adds pore functionality, i.e. the triblock terpolymer has covalent binding sites (thiol groups) that can be functionalized through conjugation methods such as, for example, methods based on thiol-ene-click chemistry, without disrupting block copolymer self-assembly of the top selective layer. The triblock terpolymer has a terminal thiol group.

For example, a triblock terpolymer comprises: a polystyrene block; a poly(4-vinylpyridine) block; and a poly(propylene sulfide) block, wherein the poly(propylene sulfide) block) has a molar mass (Mw and/or Mn) of 74 g/mol to 7,000 g/mol, including all integer g/mol values and ranges therebetween, and/or the polystyrene block has a molar mass (Mw and/or Mn) of 40,000 g/mol to 500,000 g/mol, including all integer g/mol values and ranges therebetween, and/or the poly(4-vinylpyridine) block has a molar mass (Mw and/or Mn) of 5,000 g/mol to 50,000 g/mol, including all integer g/mol values and ranges therebetween.

A triblock terpolymer can have various polydispersity. For example, a triblock terpolymer has a polydispersity (PDI) (Mw/Mn) of 1 to 2.

In an aspect, the present disclosure provides uses of films of the present disclosure. The films can be used in filtration applications (e.g., chemical/biological molecule separations, and water purification), drug delivery, and molecular sensing. Examples of filtration applications include, but are not limited to, concentration or purification of therapeutic proteins or other macromolecules, removal of water contaminants, and use as an air filter or penetrable catalyst support substrate. For example, the films can be used as filtration membranes in filtration devices (e.g., ultrafiltration devices) for concentration and/or purification or proteins, viruses, or other dissolved material, and as a separation media for liquid or vapor solutions.

The multiblock terpolymers offer a functional approach for designing a versatile assortment of mesoscale hybrid materials, such as patterned media, and devices, including batteries, solar cells, and fuel cells. In addition to applications in drug delivery and nanofluidics, copolymer-derived mesoporous films can be used as separation media.

The present disclosure provides devices. The devices comprise at least one blended film and/or at least one isoporous film of the present disclosure. Devices can be made using methods known in the art.

Non-limiting examples of devices include filtration systems/apparatuses, batteries, solar cells, fuel cells, and the like. In an example, a separation medium, such as, for example, a filtration membrane (e.g., an ultrafiltration membrane), comprises one or more film of the present disclosure. A filtration system/membrane can comprise one or more separation media (e.g., filtration membrane) that comprises one or more film of the present disclosure.

The steps of the methods described in the various embodiments and examples disclosed herein are sufficient to carry out the methods of the present disclosure. Thus, in an example, a method consists essentially of a combination of steps of the methods disclosed herein. In another example, a method consists of such steps.

The following examples are presented to illustrate the present disclosure. They are not intended to limiting in any matter.

Example 1

This example provides examples of films of the present disclosure and examples of methods of making films of the present disclosure.

In this example, asymmetric membranes with isoporous surface structures are derived from two chemically distinct triblock terpolymers blended during the standard membrane fabrication process. Through block copolymer self-assembly and non-solvent induced phase separation (SNIPS), blended ultrafiltration membranes from varying ratios of poly(isoprene-b-styrene-b-(4-vinyl)pyridine) and poly(isoprene-b-styrene-b-(dimethylamino)ethyl methacryate) enable the tailoring of pore surface chemistries and resulting membrane properties.

Deviating from the traditional formation of block copolymer (BCP) derived isoporous membranes from one block copolymer chemistry, here asymmetric membranes with isoporous surface structure were derived from two chemically distinct block copolymers blended during standard membrane fabrication. As a first proof of principle, we report the fabrication of asymmetric membranes blended from two chemically distinct triblock terpolymers, poly(isoprene-b-styrene-b-(4-vinyl)pyridine) (ISV) and poly(isoprene-b-styrene-b-(dimethylamino)ethyl methacrylate) (ISA), differing in the pH-responsive hydrophilic segment. Using block copolymer self-assembly and non-solvent induced phase separation (SNIPS) process, pure and blended membranes were prepared by varying weight ratios of ISV to ISA. Pure and blended membranes exhibited a thin, selective layer of pores above a macroporous substructure. Observed permeabilities at varying pH values of blended membranes depended on relative triblock terpolymer composition. These results open a new direction for membrane fabrication through the use of mixtures of chemically distinct block copolymers enabling the tailoring of membrane surface chemistries and functionalities.

To the best of our knowledge, however, to date no studies have been reported in which the SNIPS process was applied to the mixture of two or more chemically distinct block copolymers. This would be particularly interesting for mixtures in which the blocks that end up disposed on pore walls would be chemically distinct. In this case it would be possible to mix and match different chemistries and therefore different functionalities and properties to the pore walls during standard membrane fabrication. Previous systems that desired e.g. a combination of chemistries and/or stimuli responsive performances in the pore walls were limited to an extra post-modification grafting step on the final membrane. In contrast, we demonstrated a facile approach for the fabrication of membranes that exhibit two chemistries in the pores as a consequence of incorporating two chemically distinct triblock terpolymers into the casting dope solution. In this way, the ability to dial in different chemistries and their associated functionalities to the pore surface is accomplished during the standard fabrication step, completely eliminating extra post-modification steps. Combining different chemistries into the pore wall may enable new and attractive capabilities in selectivity, e.g. in complex protein separations.

Two triblock terpolymers, poly(isoprene-b-styrene-b-(4-vinyl)pyridine) (ISV) and poly(isoprene-b-styrene-b-(dimethylamino)ethyl methacrylate) (ISA), of similar molar mass and volume fractions, were synthesized by sequential anionic polymerization. The molar mass of ISV and ISA was 119 and 118 kg mol$^{-1}$, respectively. ISV had volume fractions of 0.22, 0.64, and 0.14, for the polyisoprene (PI; $\rho$=0.913), polystyrene (PS; $\rho$=1.05), and poly-4-vinylpyridine (P4VP; $\rho$=1.15) blocks, respectively. Similarly, ISA had volume fractions of 0.23, 0.63, and 0.14, for the PI, PS, and poly(dimethylamino)ethyl methacrylate (PDMAEMA; $\rho$=1.18) blocks, respectively. FIGS. 1a and 1b shows the chemical structures of ISV and ISA together with a table summarizing the polymer characterization results.

Figure 4:
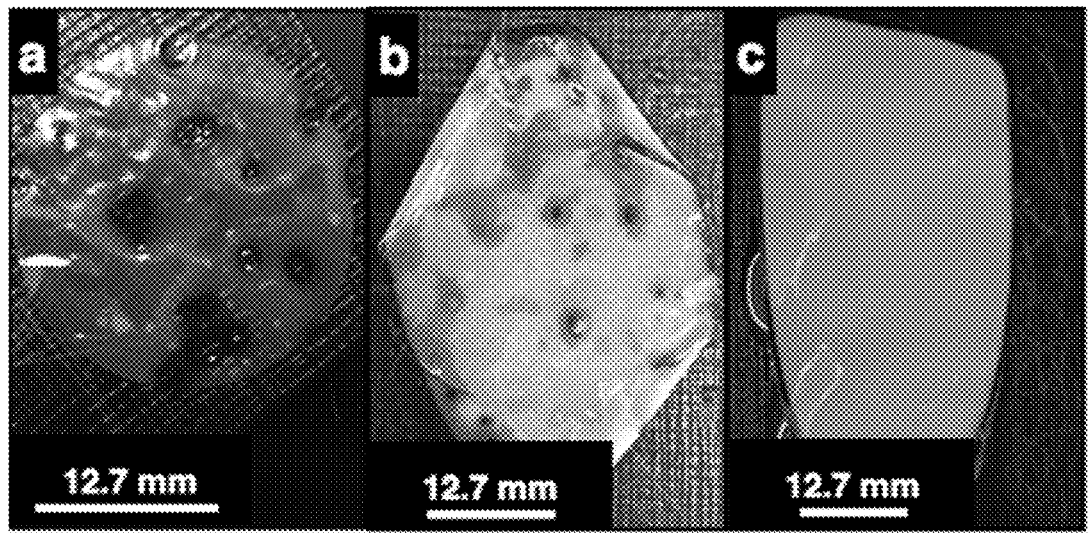
FIG. 4 shows images of a) 15% ISA in 7:3 DOX/THF, b) 15% 5:5 ISV:ISA blend in 7:3 DOX/THF, and c) 15% ISV in 7:3 DOX/THF derived membranes.

Membrane preparation, fabrication, and characterization. Membranes were fabricated by a hybrid process of block copolymer self-assembly and non-solvent induced phase separation (SNIPS). The triblock terpolymers were dissolved in an appropriate solvent system. The solvent system was chosen similar to previous studies on ISV terpolymer derived asymmetric membranes. In order to generate blended membranes, ISV and ISA were separately dissolved in the binary solvent system of 1,4-dioxane (DOX) and tetrahydrofuran (THF) in a 7:3 ratio (by weight) (7:3 DOX/THF). For pure membranes, ISV was dissolved in 7:3 DOX/THF while ISA was dissolved in dimethylformamide (DMF) and THF in a 7:3 ratio (by weight) (7:3 DMF/THF) as described in FIG. 1c. A change of the solvent system for pure ISA membranes was necessary in order to fabricate mechanically stable and cohesive membranes enabling pH-stimulus responsive performance studies (see FIG. 4a).

All membranes were cast from dope solutions with a final polymer concentration of 15 wt %. The membrane casting solutions contained different ISV:ISA weight ratios: 1:0, 9:1, 7:3, 6:4, and 0:1. Majority ISA blended membranes could not be studied as the SNIPS process did not lead to mechanically stable structures (see FIG. 4b). For casting solutions containing both triblock terpolymers, final dope solutions were prepared by mixing ISV and ISA polymer solutions and allowed to stir at 200 rpm for ten minutes before casting.

The 15 wt % dope solutions were cast onto a glass substrate using an automated blade-casting machine. The thin films were evaporated for 100 seconds. This evaporation period creates a concentration gradient in the film normal direction driving the self-assembly of block copolymers near the top surface to produce the selective skin layer while the bottom structure remains disordered resulting in a sponge-like substructure providing mechanical stability upon plunging into the water precipitation bath.

In order to correlate the addition of ISA, relative to ISV, to the casting solution with membrane structure and performance, three ISV:ISA mixing ratios (by weight) were employed: 9:1, 7:3, and 6:4. Pure ISV and ISA membranes were fabricated to serve as references. A schematic of pure and blended membrane top surface structures is shown in FIG. 1d where the different terpolymers are depicted as spheres of different color (blue: ISV; green: ISA) and for simplicity only two layers of terpolymer micelles are depicted. This schematic reflects the cubic BCP micelle morphology that is at the origin of the square pore lattice observed for ISV based BCP UF membranes.

Figure 2:
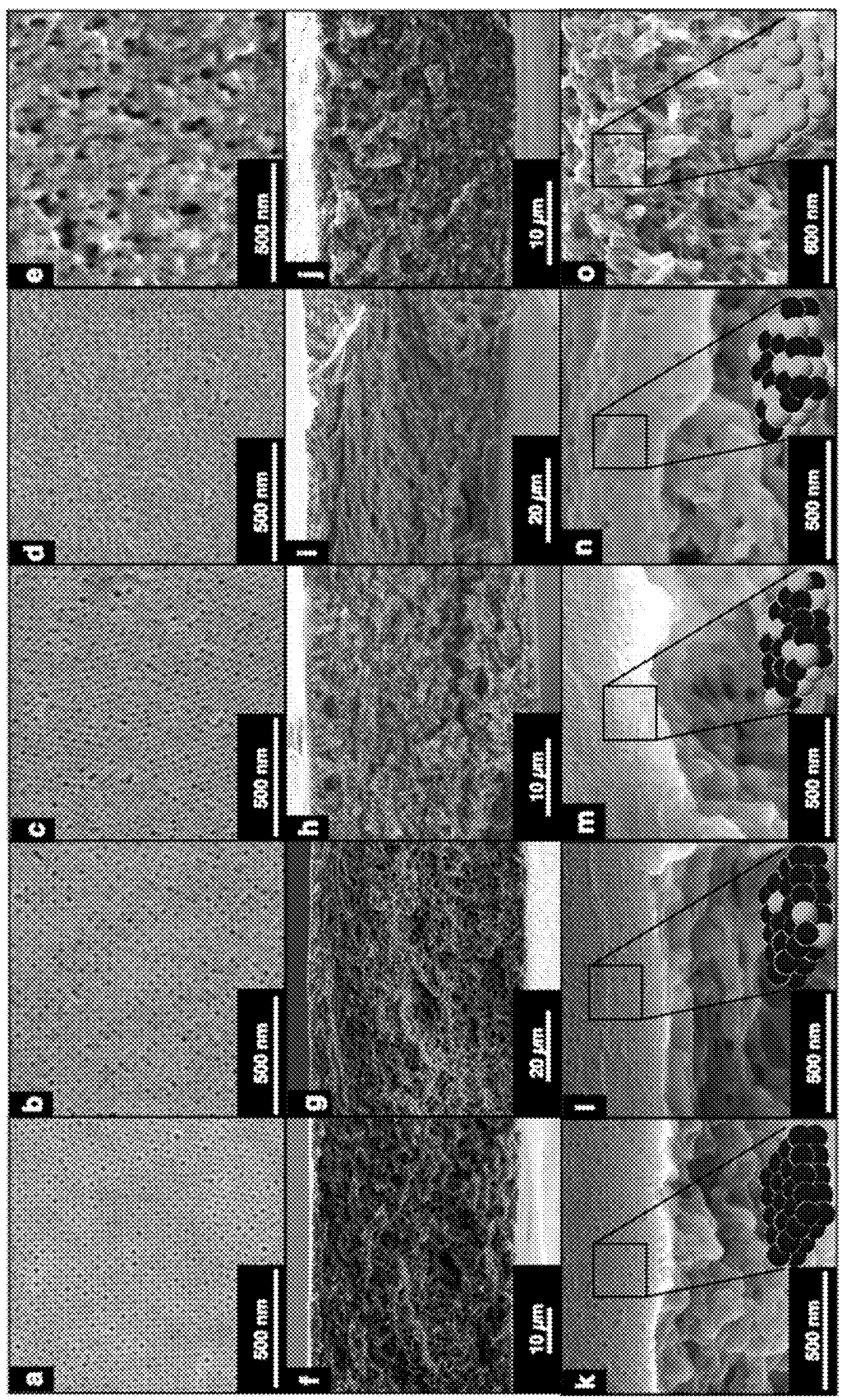
FIG. 2 shows SEM characterization of surface structures (top row), cross sections (middle row), and areas close to the surface (45° tilted images) of (a,f,k) 15% ISV in 7:3 DOX/THF, (b,g,l) 15% 9:1 ISV:ISA blend in 7:3 DOX/THF, (c,h,m) 15% 7:3 ISV:ISA blend in 7:3 DOX/THF, (d,i,n) 15% 6:4 ISV:ISA blend in 7:3 DOX/THF, and (e,j,o) 15% ISA in 7:3 DMF/THF derived membranes.
Figure 5:
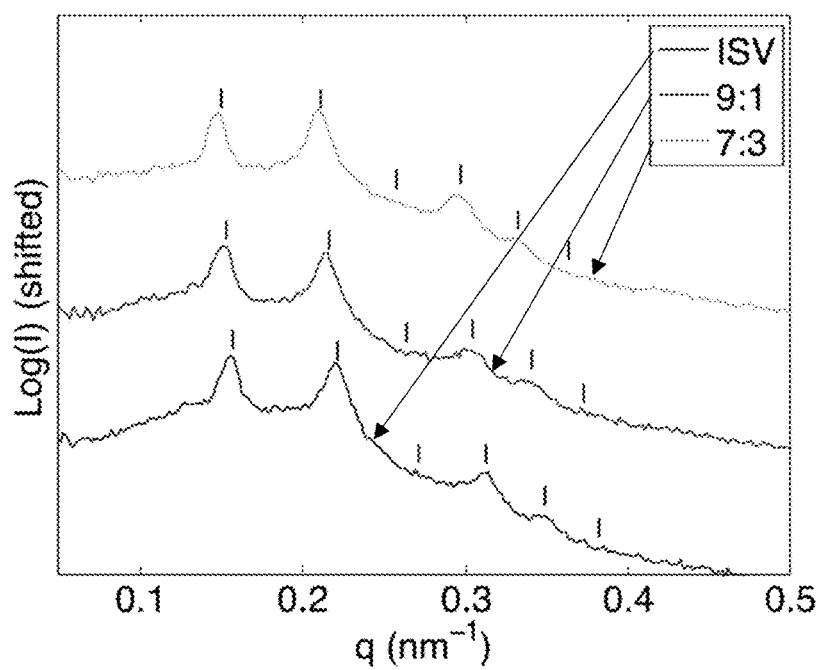
FIG. 5 shows radially integrated FFT results of SEM images of the surface structure of different membranes indexed with a 2D square lattice (see ticks). ISV (bottom), 9:1 blend (middle), and 7:3 blend (top) yielding d-spacings of 40.4, 41.5, 42.5 nm, respectively.

SEM micrographs of the resultant membranes' top surface (top row), cross section (middle row), and areas close to the top surface (45° tilted image, bottom row) are shown in FIG. 2. All five membranes are composed of a porous top surface spanning the skin layer thickness (~200 nm) above a hierarchically porous, sponge-like substructure. The pure ISV membrane (FIG. 2a) exhibited a high density of uniform pores arranged in a 2-D square lattice typically associated with ISV membranes (see FIG. 5). The surface structure reflects the underlying cubic block copolymer microphase separated lattice that was previously demonstrated. With the introduction of ISA (10% and 30%; FIGS. 2b and 2c), the top surface structure remains ordered. Both blended membranes retain a high density of well-ordered and packed pores. For the 6:4 blend a marked loss of surface order is already detected in parts of the membrane surface consistent with a disordered surface structure for pure ISA membranes (FIGS. 2d and 2e).

Figure 3:
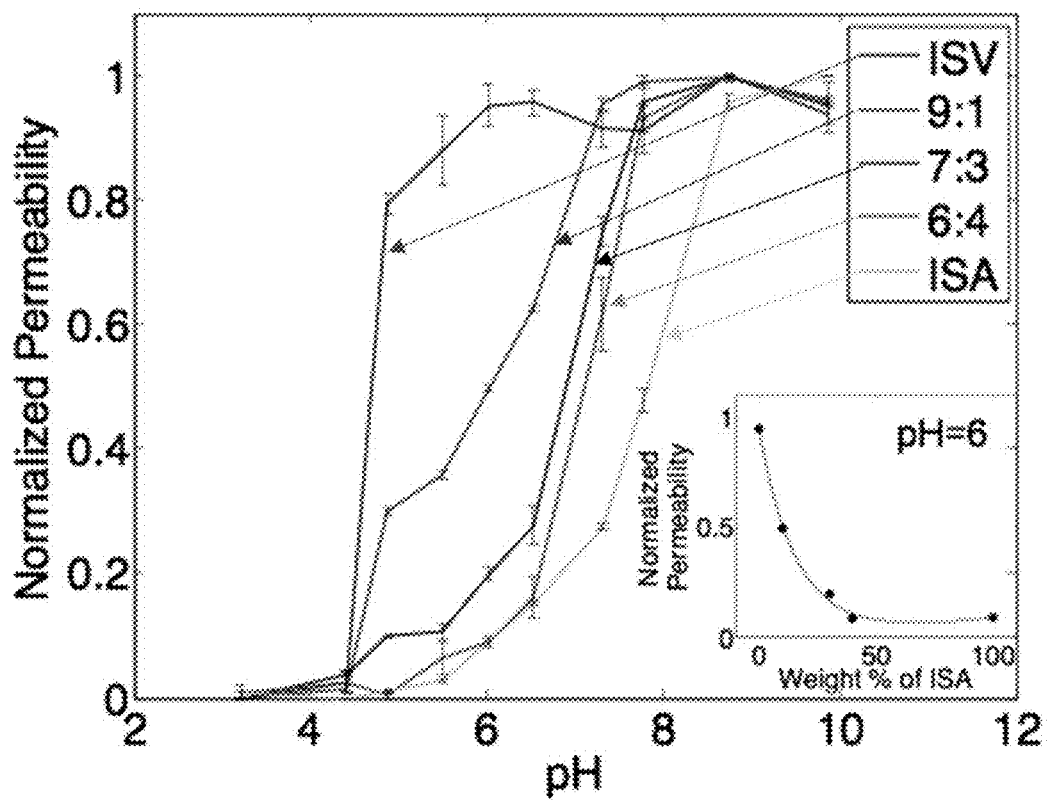
FIG. 3 shows permeability (normalized) for pure (ISV, ISA) and blended (9:1, 7:3, & 6:4 blends of ISV:ISA) membranes at various pH values. Indicated errors are standard deviations from three replicate measurements. Inset: Effect of composition on permeability at pH=6. The associated curve is used only as a guide for the eye.

Membrane Performance. In order to correlate composition with membrane performance, pH dependent permeabilities were measured for pure and blended membranes using a pressurized dead-end stirred cell as described in [0152]. Normalized permeability results from the flow experiments are presented in FIG. 3 (for absolute permeability values see FIG. 6). In a previous study it was shown that the permeability of ISV membranes is a strong function of pH due to pH dependent protonation and chain stretching of the P4VP brushes at the pore surface. This is consistent with the pH-responsive permeability observed for the pure ISV membrane in FIG. 3.

Above the $pK_a$ of 4.6 of P4VP, the permeability is high due to the low degree of protonation resulting in the collapse of the P4VP chains. Around the $pK_a$ of P4VP, the permeability decreases due to the increased protonation of P4VP causing the chains to extend towards the center of the pore and therefore, hindering transport through the membrane. A similar behavior is observed in FIG. 3 for ISA membranes where PDMAEMA chains reside at the pore walls. However, since PDMAEMA has a $pK_a$ of 7.8, the curve is shifted to higher pH values relative to behavior of ISV.

Blended membranes exhibit a mixed performance intermediate between that of pure ISV and ISA membranes. In particular, a pronounced shift to higher pH values of the pH dependent behavior is observed in membranes with increasing amounts of ISA. For example, the onset of permeability reduction occurs at a higher pH for 9:1, and at even higher pH for 7:3 and 6:4 blended membranes relative to pure ISV membrane. Details of the changes of the permeability curves relative to each other are also instructive. In all blended membranes, the majority polymer is ISV. This is consistent with the observation of decreasing low pH sections/steps in the curves that resemble ISV behavior as a function of increasing ISA weight fraction. In contrast, the high pH sections of the blended membrane permeability curves do not show pure ISA behavior but rather shift to lower pH values as a whole (vide supra). When normalized permeability for the blended membranes is plotted versus wt % ISA for a pH value around 6, i.e. midway between the $pK_a$ values of ISV and ISA (see inset FIG. 3), the sensitivity to composition becomes quite apparent. Finally, at pH 3, the full protonation of PDMAEMA and P4VP segments are achieved enabling the full extension of all charged chains resulting in minimum permeability. The same trends and behaviors were observed in an independent replicate of membrane formation and measurements for pure ISV and ISA and blended (9:1, 7:3, & 6:4 blends of ISV and ISA) membranes (see FIG. 7).

In summary, self-assembly and non-solvent induced phase separation process (SNIPS) was utilized to fabricate blended membranes comprised of two chemically distinct triblock terpolymers, ISV and ISA. The asymmetric blended membranes possess an ordered surface structure packed in a 2-D square pore lattice above a hierarchically porous sponge-like substructure. Their pH dependent behavior is based on the relative percentage of ISV to ISA, enabling the tailoring of transport properties and tunability in the gating mechanism.

The generation of blended membranes by simply "mixing and matching" two chemically distinct triblock terpolymers in the casting solution demonstrates a pathway to advanced asymmetric block copolymer derived UF membranes in which different pore surface chemistries and associated functionalities can be integrated into a single membrane via standard membrane fabrication, i.e. without requiring laborious post-fabrication modification steps. As the present proof of principle experiments have shown these mixed chemistries result in performance profiles different from those of membranes obtained from either of the two constituting block copolymers alone. It is considered that the work will have interesting implications for separation applications. For example, blending two distinct chemistries into the membrane surface may provide affinities to proteins that are different to those of membranes obtained from either of the two constituting block copolymers alone, and therefore may lead to improved selectivity. And the blending may not be confined to only two block copolymers but may be extended to multiple (i.e. more than two) chemically distinct block copolymers and block copolymers with different end functionalities, enabling to tailor membrane properties in unprecedented ways.

Methods. The triblock terpolymers, poly(isoprene-b-styrene-b-(4-vinyl)pyridine) and poly(isoprene-b-styrene-b-(dimethylamino)ethyl methacrylate), were synthesized via a sequential anionic polymerization technique. Detailed descriptions were previously described in the art. The molar mass of ISV and ISA in tetrahydrofuran (THF) as the solvent was determined by gel permeation chromatography (GPC) on a Waters Ambient-Temperature GPC equipped with a Waters 410 differential refractive index detector. The volume fraction of each domain was determined by a combination of GPC on individual blocks (PI) with $^1$H solution nuclear magnetic resonance ($^1$H NMR) on a INOVA 400 MHz spectrometer with CDCl$_3$ as the solvent.

Membranes were fabricated as described in paragraphs [0139]-[0141]. A hole punch was used to punch out sections of the membrane with an active area of 4.1 cm$^2$ for pH dependent permeability measurements.

SEM micrographs were acquired using a Tescan Mira3 field emission scanning electron miscrope (FE-SEM) equipped with an in lens detector. Prior to SEM imaging, samples were coated with Au—Pd for 6 s using a Denton Vacuum Desk II sputter coater. FFT image analysis was performed on surface SEM micrographs using ImageJ64 software with the Radial Profile Extended plugin (Philippe Carl).

For pH-stimulus responsive performance tests, pure and blended membranes were evaluated in a 10 mL dead end stirred ultrafiltration test cell (Amicon 8010, Millipore) with an applied pressure of N$_2$ gas at ~0.07 bar. The experimental details of the tests were previously described in the art. During the test, the volume of buffer solution permeated was <10 mL. Three data points under the same applied pressure were averaged to estimate the permeability under different pH conditions. Sodium acetate-acetic acid solutions were prepared as buffers with pH less than 6. Imidazole-hydrochloric acid solutions were prepared as buffers ranging from pH 6 to 10. The buffers were tested with a pH meter before performance tests were conducted.

Mechanical Stability of Membranes. Images of pure ISA in 7:3 DOX/THF (FIG. 4) and 5:5 ISV/ISA blend in 7:3 DOX/THF (FIG. 4b) derived membranes contrasted to pure ISV in 7:3 DOX/THF (FIG. 4c) derived membrane reveal problems in obtaining homogeneous membranes with good mechanical stability. As a result, studies of majority ISA blended membranes in the solvent system 7:3 DOX/THF were not possible. Furthermore, based on these results, in order to obtain pure ISA based membranes the solvent system was changed from 7:3 DOX/THF to 7:3 DMF/THF. This provided membranes without holes while featuring a similar appearance to pure ISV membranes enabling examination of performance characteristics serving as a comparison for pure ISV and blended ISV/ISA membranes.

Image Analysis. SEM micrographs of the top surfaces of the three most ordered membranes analyzed by ImageJ software to produce a two-dimensional fast Fourier transform (FFT) pattern. The radially integrated FFT patterns confirm pores packed in a 2-D square pore geometry for 9:1 and 7:3 blended membranes (FIG. 5), similar to pure ISV membranes. The calculated pore-to-pore distance is 40.4, 41.5, and 42.5 nm for pure ISV, and 9:1 and 7:3 blended membranes, respectively.

Figure 6:
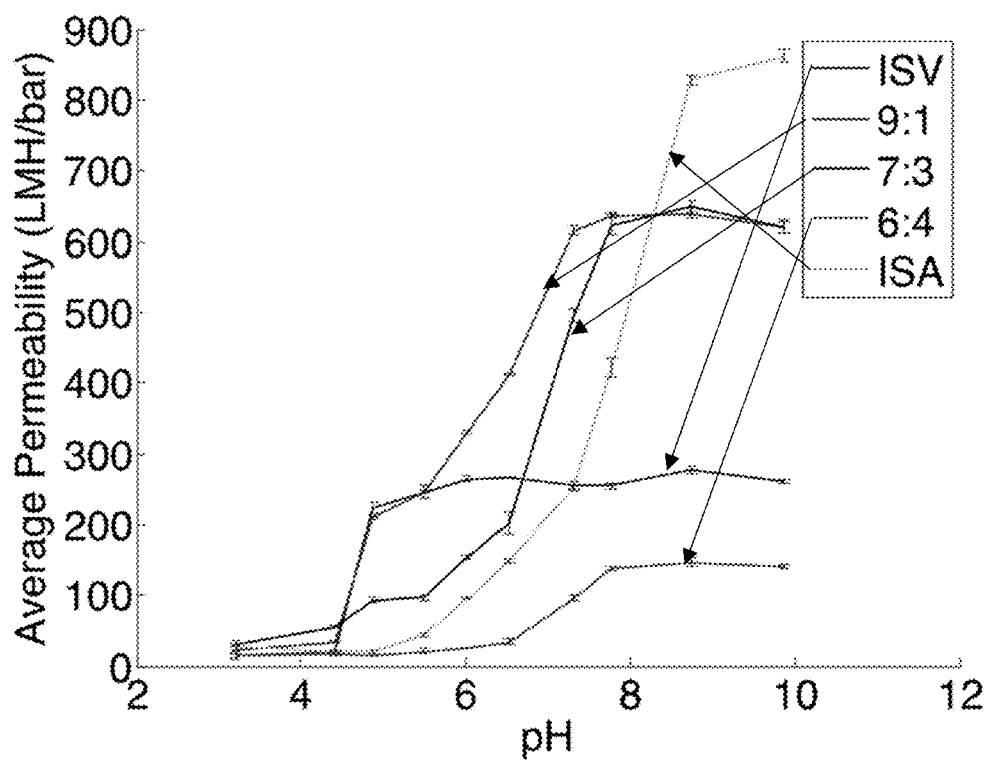
FIG. 6 shows average absolute permeability for pure (ISV, ISA) and blended (9:1, 7:3, & 6:4 blends of ISV:ISA) membranes at various pH values. Indicated errors are standard deviations from three replicate measurements.

Performance Tests. pH dependent permeabilities were measured for pure ISV and ISA membranes, as well as for membranes blended from ISV and ISA (9:1, 7:3, and 6:4), at various pH values. FIG. 6 depicts the absolute permeabilities while the normalized data set is presented in FIG. 3.

Figure 7:
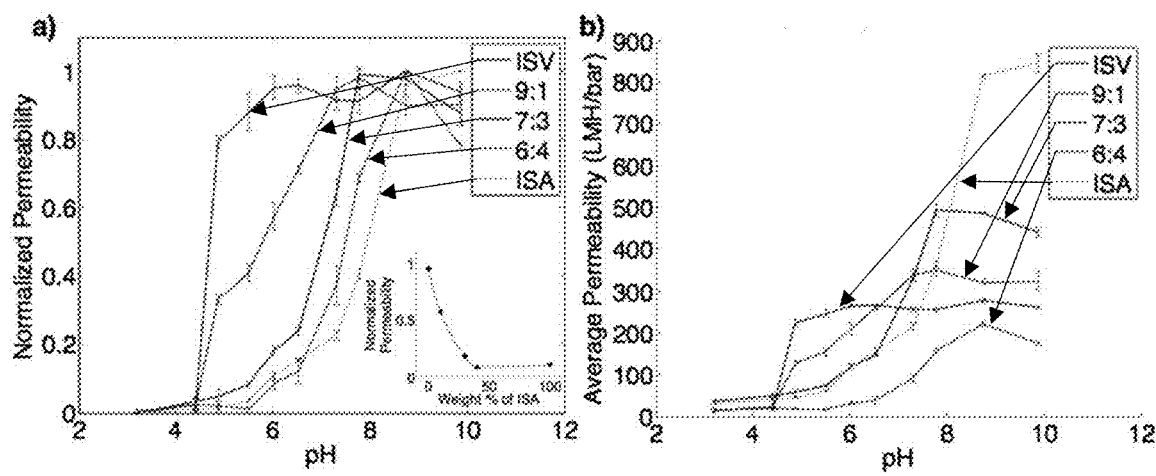
FIG. 7 shows average a) normalized and b) absolute permeability values for pure (ISV, ISA; replicates) and blended (9:1, 7:3 & 6:4 blends of ISV:ISA; replicates) membranes at various pH values. Indicated errors are standard deviations from three replicate measurements. Inset: Effect of composition on permeability at pH=6. The curve through the data points is used as a guide for the eye.

Replicate experiments were performed on a separately produced set of pure ISA and blended (9:1, 7:3, & 6:4 blends of ISV+ISA) membranes with the results shown in FIG. 7. The same behavior and trends are reproduced as for the data set shown in FIGS. 3 and 6. Although there may be other parameters influencing absolute permeabilities, the fact that the relative trends were the same between two completely separate sets of membranes suggests that dope viscosity, which is expected to vary as a function of dope composition, could be the leading parameter responsible for the variation in absolute permeabilities.

Example 2

This example provides examples of block copolymers of the present disclosure, examples of methods of making block copolymers of the present disclosure, and films made from block copolymers of the present disclosure.

The triblock terpolymer used in this example, poly(styrene)-block-poly (4-vinylpyridine)-block-poly(propylene sulfide) (SVPS), was successfully synthesized with a very small poly(propylene sulfide) (PPS) fraction. Terminal sulfhydryl groups were introduced when the PPS block was terminated by a proton donor during anionic polymerization. Via SNIPS the terpolymer was successfully processed into an asymmetric ultrafiltration membrane. In addition to the pH responsiveness from the P4VP component, the end PPS block provides thiol functional groups for covalent bonding via thiol-ene click chemistry. This reaction is versatile towards numerous biomolecules and results in strong covalent bonds, offering a versatile platform for foreign molecule attachment. Although not studied in depth here, the oxidation-responsive behavior of the PPS block is another interesting feature that could potentially add to the membrane's multi-functionality.

The fact that the short functional PPS end block is linked to the P4VP middle block ensures that the sulfhydryl groups line the pore walls and membrane surfaces. The macromolecular design of SVPS thereby should not only enable stimuli responsive behavior but at the same time should allow chemical modifications of the pore walls. This concept may be generalized to future designs of block copolymer architectures providing extended responsiveness and multi-functionality of SNIPS derived membranes.

Poly(styrene)-block-poly(4-vinylpyridine)-block-poly (propylene sulfide) (SVPS) was synthesized via sequential anionic polymerization. The polymerization of styrene was initiated with sec-butyllithium in tetrahydrofuran (THF) and was conducted for four hours in a dry ice/isopropanol bath at –78° C., before the addition of 4-vinylpyridine (4VP). The polymerization of 4VP was conducted at –78° C. for three hours. Upon the complete polymerization of 4VP, propylene sulfide monomer was added at –78° C. The reaction was allowed to warm up to room temperature and stirred for another two hours. The polymer was then terminated with acidic methanol, precipitated into a water/methanol mixture, and vacuum dried at 50° C. for two days. The SVPS triblock terpolymer used in this study has a molar mass of 63 kg/mol, a polydispersity index of 1.06 and weight fractions of 0.74, 0.22, and 0.04 for polystyrene, poly(4-vinylpyridine) and poly(propylene sulfide) blocks, respectively.

Poly(styrene)-block-poly(4-vinylpyridine) (SV) was synthesized in a similar way as a control polymer. Polymerization was conducted for both monomers in THF at −78° C. and terminated with methanol. The SV block copolymer described in this study has a molar mass of 103 kg/mol, a polydispersity index of 1.19 and weight fractions of 0.74 and 0.26 for polystyrene and poly(4-vinylpyridine) blocks, respectively.

Figure 9:
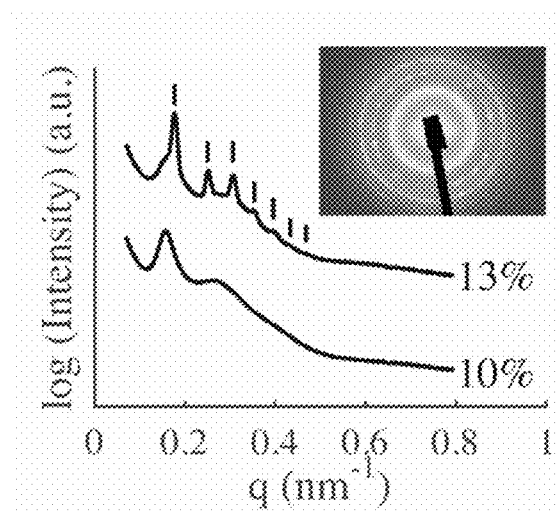
FIG. 9 shows SAXS patterns of concentrated SVPS solutions. Peaks are indexed according to $(q/q^*)^2=1, 2, 3, 4, 5, 6$, and 7, consistent with an ordered BCC lattice of BCP micelles.

Material Characterization. Polymer molar mass characterization was performed via a combination of gel permeation chromatography (GPC) and NMR. The GPC instrument was equipped with a Waters 515 pump, PSS GRAM 100-1000-3000 columns and an Agilent 1200 refractive index detector, using N,N-dimethylformamide (DMF) as eluent. $^1$H NMR measurements were performed on an INOVA 600 NMR spectrometer at 600 MHz using chloroform-d as the solvent. Scanning electron microscopy (SEM) images of membranes were acquired on a Tescan LM Mira3 FE-SEM with an in-lens detector. Fast Fourier transform (FFT) analysis of the membrane top surface in FIG. 10a was obtained via ImageJ with the Radial Profile Extended plugin (Philippe Carl). Image processing is detailed in the Supporting Information. Solutions for small-angle X-ray scattering (SAXS) were prepared by dissolving different amounts (see main text) of SVPS terpolymer into a solvent mixture of THF and dioxane (DOX) (1:1 by weight), with solutions centrifuged into 0.9 mm glass capillaries (Charles-Supper Co.) and capillaries flame sealed. SAXS patterns of the solutions were obtained at station G1 of the Cornell High Energy Synchrotron Source (CHESS) using a point-collimated beam with a typical sample-to-detector distance of 2.3 m and incident photon energy of 9.83 keV. 2D scattering patterns were collected using a Pilatus3-300 k pixel array detector (Dectris, Inc.) and radially integrated to give the spectra shown in FIG. 9. The scattering vector, q, is defined as $q=(4\pi)\sin \theta/\lambda$, where $\theta$ is half of the scattering angle and $\lambda$ is the X-ray wavelength, $\lambda=0.1247$ nm.

Membrane preparation. SVPS membranes were fabricated from a 9 wt % solution in THF/DOX (1:1 by weight) and SV membranes from a 15 wt % solution in THF/DMF/DOX (1:1:1 by weight) via the SNIPS process. All membranes were casted by doctor-blading at a gate height of 220 μm. The evaporation time was 45 s for SVPS membranes and 20 s for SV membranes before immersion into a deionized water bath.

Ellman's reagent experiments. A 0.01 M Ellman's reagent (5,5'-dithiobis-(2-nitrobenzoic acid) or DTNB) stock solution in methanol and a 0.2 M tris-buffer containing 0.02 M (EDTA Na$_2$) were prepared separately. Then 1.5 mL tris-buffer, 0.1 mL DTNB stock solution, and 8.4 mL methanol were mixed together as Ellman's reagent solution (final solution was in a buffer/methanol mixture, 15:85 by volume). Two membranes with area, A, of 5 cm$^2$ each were soaked in 2 mL Ellman's reagent solution. The solutions were tested for absorbance after 12 h reaction.

The amount of total and accessible thiol groups was calculated as follows:

Total thiol groups per area=(membrane weight)/(SVPS molecular weight×$A$) Accessible thiol groups per area=(Absorbance at 412 nm×$V$)/(Extinction coefficient×$L$×n×$A$)

where V is the volume of Ellmans's solution, n is the number of membranes soaked in the solution, A is the area of the membrane, and L is the cuvette path length.

Redox reactions with SVPS. SVPS polymer, stored at 4° C., was thawed and dissolved in DMF. An aliquot was taken for GPC analysis representing "as-made polymer" as a control. The solution was stirred in air at 60° C. for 29 hours to oxidize thiols into disulfides and an aliquot was taken for GPC analysis representing "oxidized polymer". An excessive amount of reducing agent dithiothreitol (DTT) was added to the oxidized polymer solution. The solution was stirred at 60° C. for four days and an aliquot was taken for GPC analysis representing "reduced polymer".

Hydraulic permeability tests. A 10 mL stirred dead-end ultrafiltration test cell (Amicon 8010, Millipore, effective area 4.1 cm$^2$) was used in the permeability tests. The feed buffer solutions of different pH were all stirred at 400 rpm and pressurized between 0.1-0.5 bar.

The hydraulic permeability of the membrane was determined by the ratio of the volumetric filtrate flux (L m$^{-2}$ h$^{-1}$) to the trans-membrane pressure.

The —SH thiol group is one of the most common functional groups in biomolecules and is highly versatile in biochemical reactions. Click chemistry with maleimide groups efficiently forms covalent bonds. We generated SNIPS membranes with binding sites by making a BCP that contains sulfhydryl groups. Previous studies have shown that such sulfhydryl end-functionalization can be achieved when terminating anionic polymerization of cyclic sulfides with alcohols.

Figure 8:
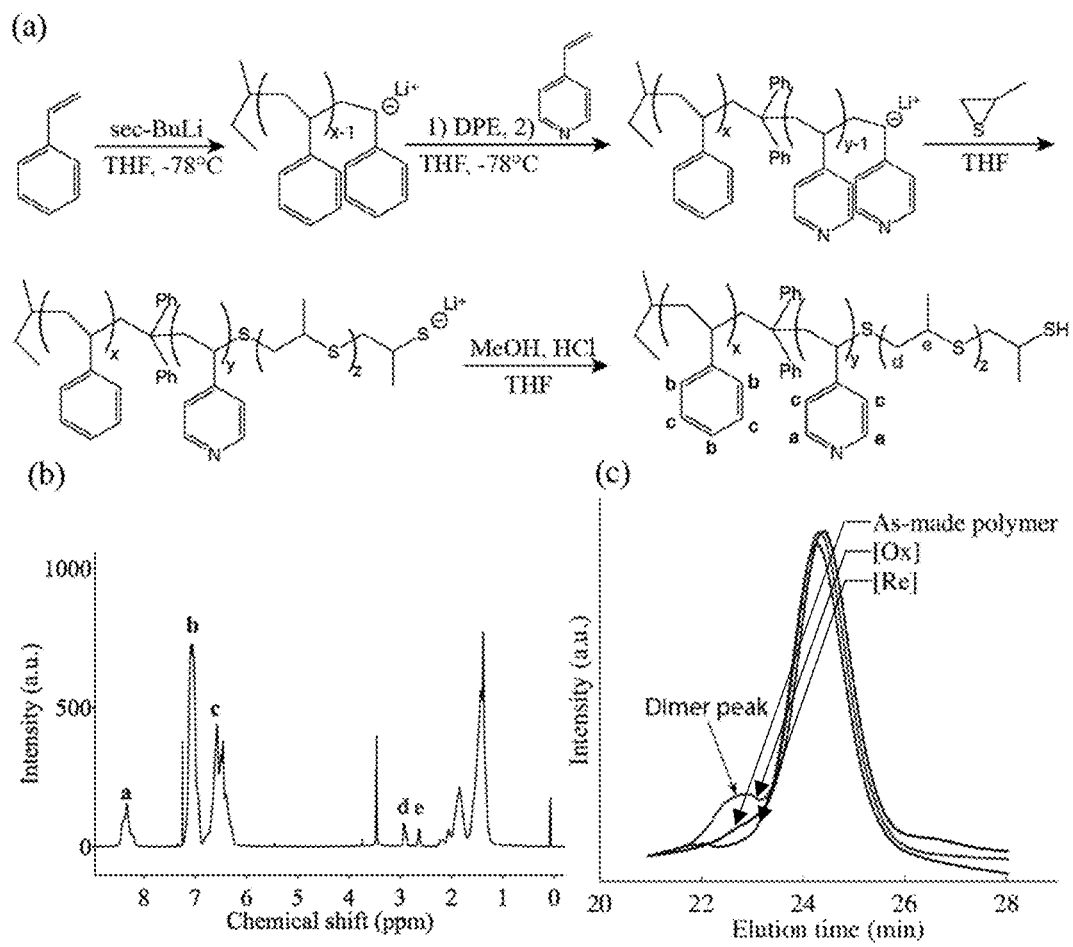
FIG. 8 shows (a) synthesis scheme and (b)$^1$H NMR spectrum of triblock terpolymer poly(styrene-b-(4-vinyl) pyridine-b-propylene sulfide). (c) GPC trace in DMF of as-made polymer (black), polymer oxidized by air at 60° C. (red), and polymer reduced by DTT after oxidization (blue).

In the synthesis of triblock terpolymer, poly(styrene)-block-poly(4-vinylpyridine)-block-poly(propylene sulfide) (SVPS) a terminal sulfhydryl group was introduced at the end of each polymer chain. FIG. 8a illustrates the synthesis procedure with details described in paragraphs [0160] and [0161]. When polymerization of the third PPS block was completed, the thiolate living centers were saturated with proton donors (methanol) to give one sulfhydryl group per chain. Peak d and e in the $^1$H NMR spectrum of the polymer (FIG. 8b) are characteristic peaks for poly(propylene sulfide). The relative amount of PPS block is 4% by weight. Such a short end block is desired as the focus is on the terminal thiol groups. When SNIPS membranes are fabricated from PS-b-P4VP, the pore walls and surfaces are lined with P4VP. The short length of the PPS block should minimize its influence on the SNIPS process, and thiol groups are expected on the membrane surface rather than being buried inside the membrane.

To demonstrate the presence of active thiol groups, a redox reaction was conducted. Two molecules with free thiol groups can be oxidized and linked together by forming a disulfide bond. If the molecules are identical the product has twice the molar mass of the original molecules, therefore referred to as "dimer" here. In turn, the dimer can be reduced to its parent molecules by reducing agents that specifically target disulfide bonds (e.g. dithiothreitol, DTT). The SVPS was first oxidized in solution by air and then reduced the product with DTT. Molar masses for each step were monitored by GPC (FIG. 8c). The small shoulder at the dimer position of the GPC trace for the as-made polymer most likely stems from a small amount of oxidized polymer already present after preparation and storage. As GPC traces (FIG. 8c) demonstrate, after oxidation a pronounced dimer peak appeared to the left of the parent polymer peak (red trace). After adding DTT, the dimer peak completely disappeared (blue trace). The fact that only a fraction of the polymer peak shifted to the dimer peak during oxidation is expected and likely due to the macromolecular nature of the molecules; it is kinetically difficult for two terminal thiols on two polymers of over 60 kg/mol molar mass to find each other in dilute solutions. The lack of an oxidizing agent in solution and reliance on O2 from air likely is another factor. These experimental results together support the successful incorporation of active sulfhydryl groups in the SVPS polymer chain.

Membrane fabrication and characterization. The SNIPS process, as aforementioned, is a convenient and scalable method to fabricate asymmetric polymeric membranes with an isoporous ultrafiltration layer. However, for a new polymer the preparatory work typically requires screening over a large parameter space including appropriate solvent or solvent mixtures, solution concentration, evaporation time, etc. The conventional trial and error approach to optimize casting conditions can be accelerated using solution screening by small-angle X-ray scattering (SAXS). To that end SVPS polymer solutions with different solvent systems and concentrations were tested. For an appropriate solvent system, solution SAXS shows a highly ordered micelle structure when concentrations are above a certain threshold value. Typically, concentrations of the membrane casting solution right below this threshold results in well-organized surface separation layers. Two representative solution SAXS curves are shown for SVPS in FIG. 9. The solvent system chosen was DOX/THF (1:1 by weight) and concentrations were 10 wt % and 13 wt % for the lower and upper curve, respectively. While for the 10 wt % solution assignment of a lattice was impossible as a result of the few and very broad peaks, for the 13 wt % solution the curve showed multiple peaks consistent with a body centered cubic (BCC) lattice of SVPS micelles.

Following the rational described above for the SNIPS process the solution concentration was reduced to 9%.

Figure 10:
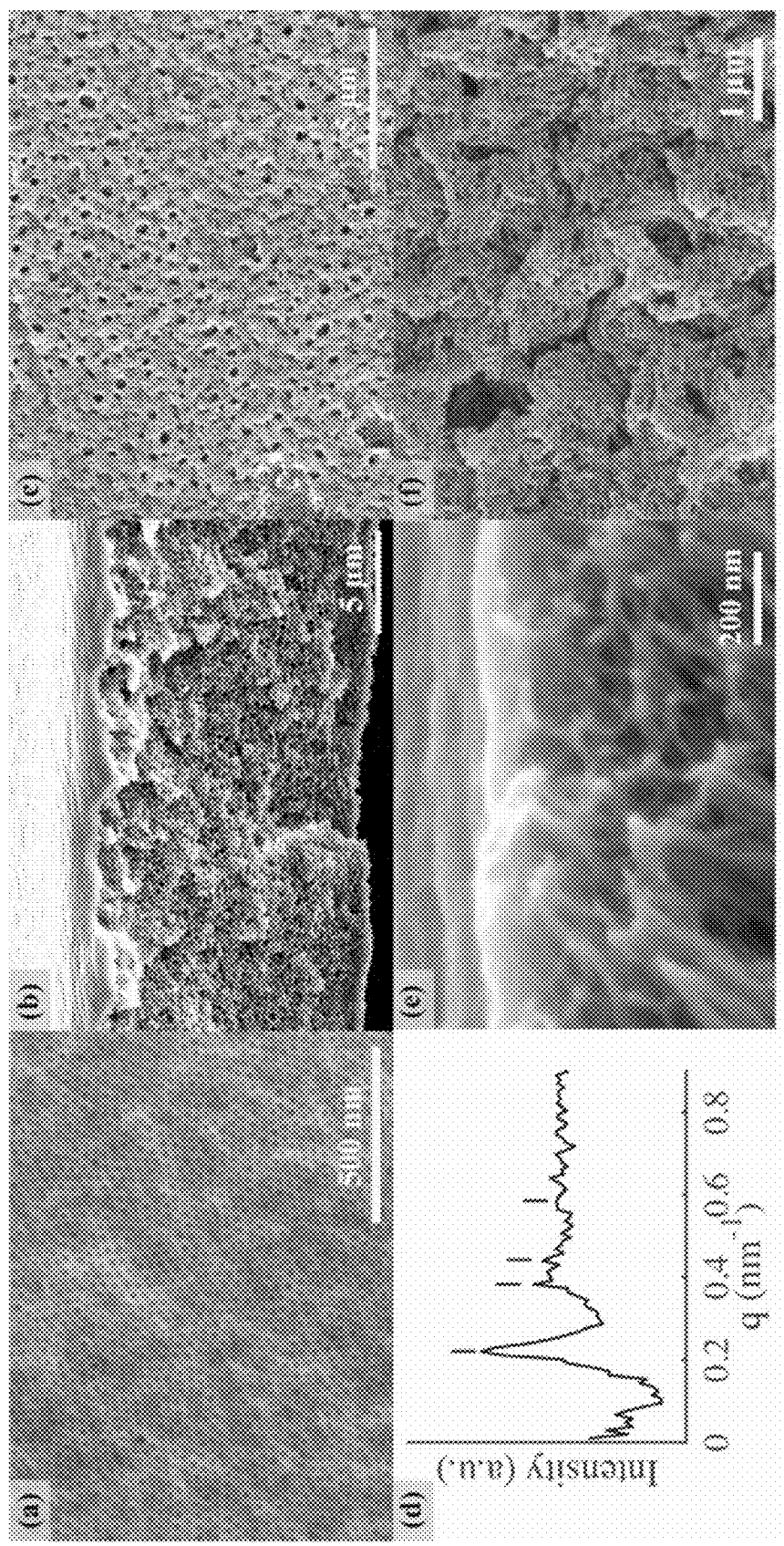
FIG. 10 shows SEM characterization of (a) top surface, (b,e) cross section, and (c,f) bottom surface of a SVPS membrane. (d) FFT analysis of top surface SEM image. Peaks correspond to $(q/q^*)^2=1, 3, 4$, and 7, indicating expected peak positions for a 2D hexagonal lattice.

Indeed, for 45 s (s=second(s)) evaporation time SNIPS membranes with regularly patterned surfaces were obtained. SEM characterization of the top surface shows mesopores with narrowly dispersed pore sizes (~17 nm) well-organized into a 2D hexagonal lattice (FIG. 10a). This was corroborated by FFT analysis (FIG. 10d) of the image. The cross section of the membrane (FIG. 10b) shows a sponge-like structure with a thickness around 20 µm. A zoomed-in image of the cross section (FIG. 10e) and bottom surface images (FIGS. 10c and 10f) show a spaghetti-type substructure with macropores below the separation layer. Such an asymmetric isoporous structure not only favors high selectivity but also allows for high permeability. Both features are crucial factors in membrane performance.

Figure 11:
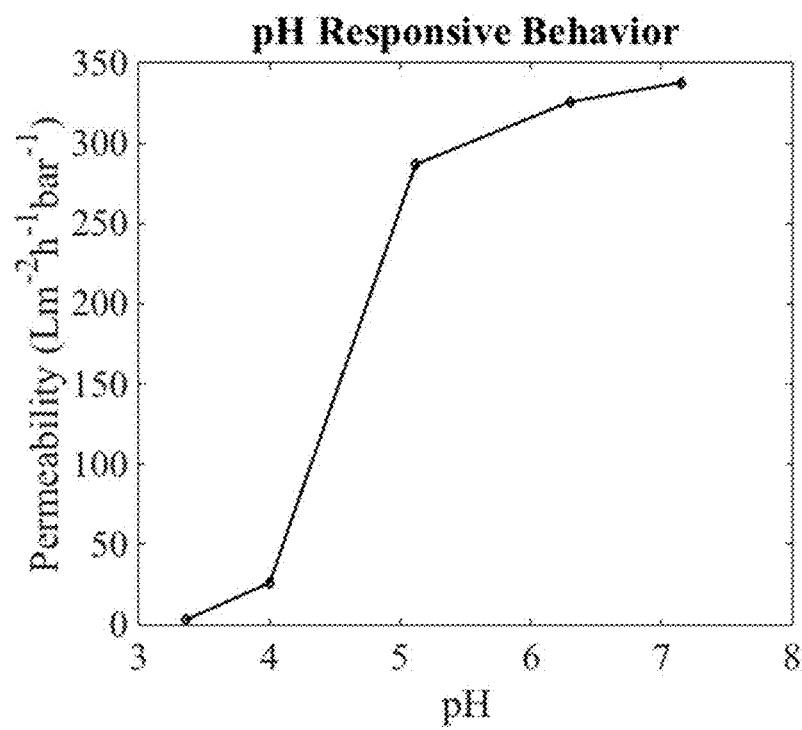
FIG. 11 shows pH-responsive behavior of a SVPS membrane.

Stimuli responsive membrane behavior. pH response is a characteristic property of SNIPS membranes containing P4VP blocks in the pore walls. Such pH-responsive behavior is due to P4VP protonation/deprotonation. Hydraulic permeability tests of SVPS membranes were conducted with buffer solutions of various pH. In FIG. 11 the SVPS membrane maintains a relatively high permeability in the high pH regime, which decreases significantly as pH drops from 6 to 4. These results are consistent with mesopores of the ultrafiltration layer coated with P4VP brushes. From these results it is evident that the short PPS block does not undermine the desirable membrane structure formation and stimulus responsive behavior.

Figure 12:
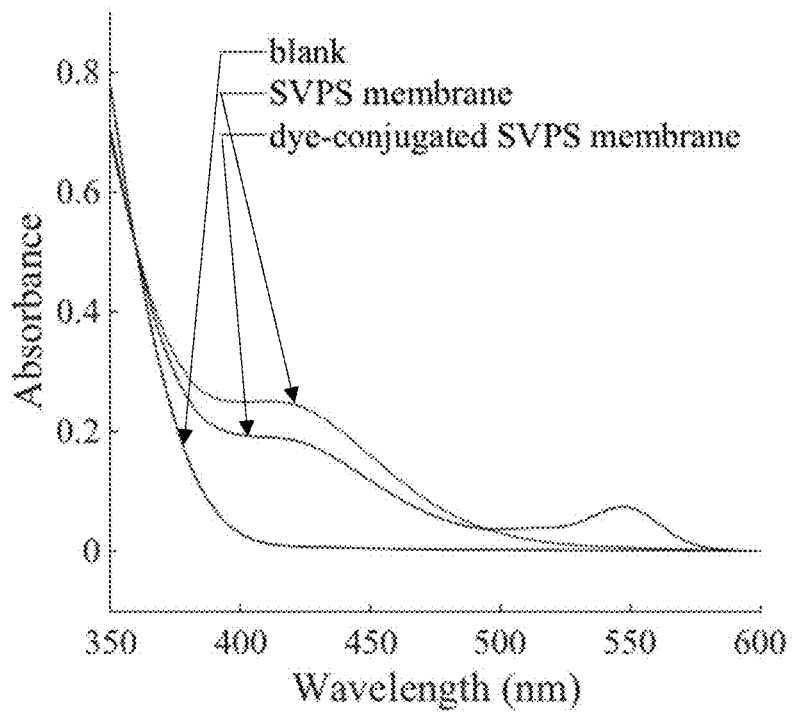
FIG. 12 shows Ellman's reagent test results. SVPS membranes (red line) and dye-conjugated SVPS membranes (blue line) were soaked in Ellman's reagent solution and aliquots were taken for absorbance spectra at 12 h. An aliquot of blank sample (without membrane) was taken at 12 h as a reference. The peaks around 412 nm indicate the existence of active sulfhydryl groups in the membranes.

Quantification of accessible thiol groups. After membrane fabrication via the SNIPS process, an obvious question was if the functional groups are still accessible. Although sitting right on the P4VP block likely exposing the PPS block and thiol groups to the surface of mesopores, functional groups could still be more or less buried. To assess the accessibility of thiol groups, we designed an experiment performed on asymmetric SVPS membranes with Ellman's reagent, a commonly used chemical for detecting thiols in bio-systems. When free sulfhydryl groups react with Ellman's reagent, the solution turns yellow as a result of the reaction product absorbing light at a wavelength of 412 nm. Unlike the normal Ellman's reagent used in bio-systems, we employed a recipe adopted those previously described in the art using a methanol/buffer mixture rather than buffer solution only as the solvent. This modification helps restrain the self-decomposition of Ellman's reagent. Membranes were soaked in Ellman's reagent solution while gently stirring with a spinbar. The Ellman's reagent solution was colorless prior to membrane immersion. After soaking the thiol functionalized membranes, the solution gradually turned yellow with the color deepening over time. Aliquots were taken for optical absorbance measurements after 12 h (h=hour(s)). Clear absorption peaks were observed around 412 nm (FIG. 12, line labelled "SVPS membrane"). An experiment with a blank sample (no membrane) was conducted in the same way as a control and no peak at 412 nm was observed after 12 h (FIG. 12, line labelled "blank"). The result of the Ellman's reagent experiment is consistent with accessible thiol groups after membrane formation via SNIPS. We further quantified the amount of accessible thiol groups using the absorbance at 12 h and an extinction coefficient of $13100$ $M^{-1}$ $cm^{-1}$ as previously described in the art. The total amount of thiol groups was estimated according to each membrane's weight and dimension. Results listed in Table 1 indicate that about 21% of the total functional groups in the membrane are accessible. While this analysis suggests that accessibility is not 100%, likely due to effects like chain end folding back into the membrane surface layer, results reveal abundant covalent binding sites in the SVPS membranes highlighting the potential for covalent membrane modification post-fabrication.

TABLE 1

Quantification of thiol groups in membrane

| Total thiol groups/area (mol/cm$^2$) [a,c] | Accessible thiol groups/area (mol/cm$^2$) [b,c] | Accessible thiol groups percentage | Covalent bonds/area (mol/cm$^2$) [d] | Percentage of accessible thiol groups formed covalent bonds [d] |
|---|---|---|---|---|
| $1.7 \times 10^{-8}$ | $3.6 \times 10^{-9}$ | 21% | $9.2 \times 10^{-10}$ | 26% |

[a] Total thiol groups amount are calculated according to membrane weight, polymer molar mass, and assumption that each polymer chain contains one thiol group
[b] Accessible thiol groups amount are calculated according to the 12 hours Ellman's reagent experiment and the extinction coefficient $13100$ $M^{-1}$ $cm^{-1}$
[c] Each membrane has an area of 5 cm$^2$ and an average weight of 0.0054 g
[d] Covalent bonds between membrane and TMR dye are calculated according to the 12 hours Ellman's reagent experiment of SVPS membrane and dye-conjugated SVPS membrane with the extinction coefficient $13100$ $M^{-1}$ $cm^{-1}$ Foreign functionalizing molecule attachment. To acquire additional functionality, one of the commonly used methods is to mix foreign molecules with the membrane casting dough. However, such a route is not realistic for bio-receptors since BCP solutions are usually made from organic solvents that would easily denature proteins and enzymes. Alternative routes include a binding layer, which requires an extra formation step and may not be permanent. The simplest approach is to immerse the membrane in a solution containing the foreign molecule. In conventional membranes such methods rely on nonspecific and noncovalent binding of foreign molecules. In contrast, based on the experimental results reported so far SVPS membranes should have the ability to form specific covalent bonds with targeted molecules based on the accessible sulfhydryl groups on the membrane pore surface.

Figure 13:
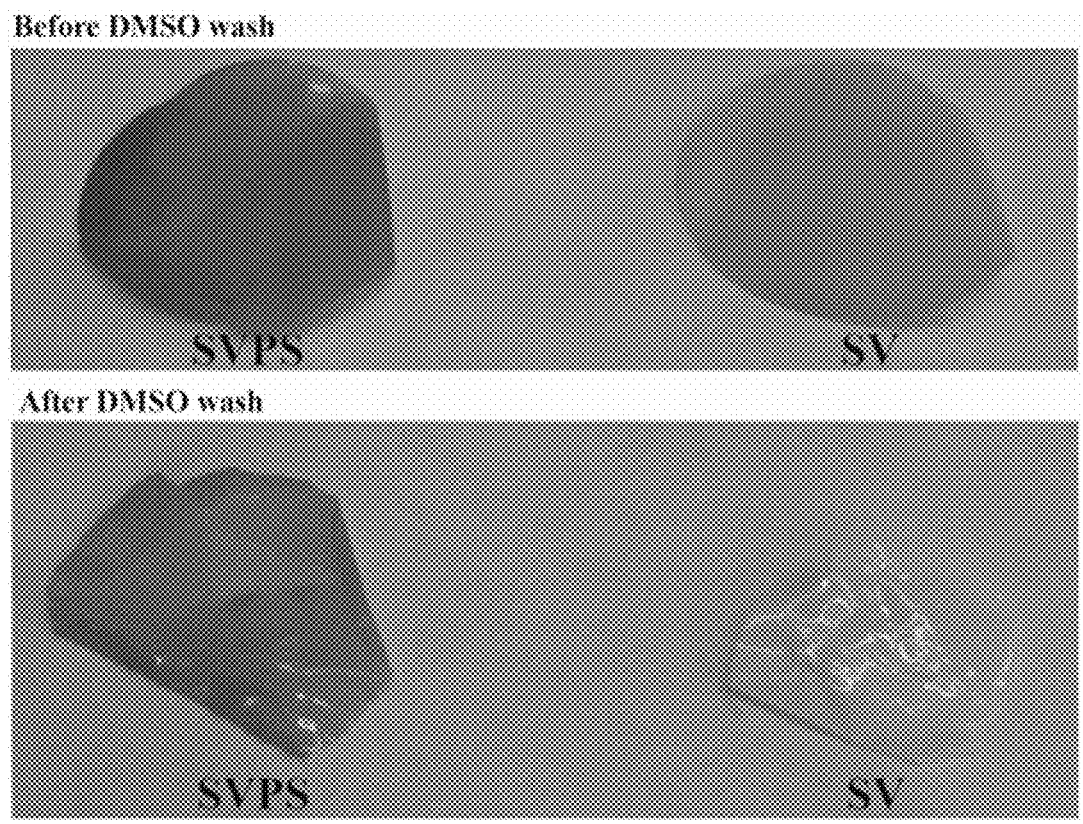
FIG. 13 shows functionalized-dye conjugation assessment. SVPS and SV (control group) membranes were soaked in a maleimide-functionalized TMR dye solution. Both groups had a pink appearance after soaking. With a rinse in DMSO, the pink shade remained in the SVPS membrane while it faded in the SV membrane, consistent with covalent bonding between SVPS membrane and maleimide-functionalized dye.
Figure 14:
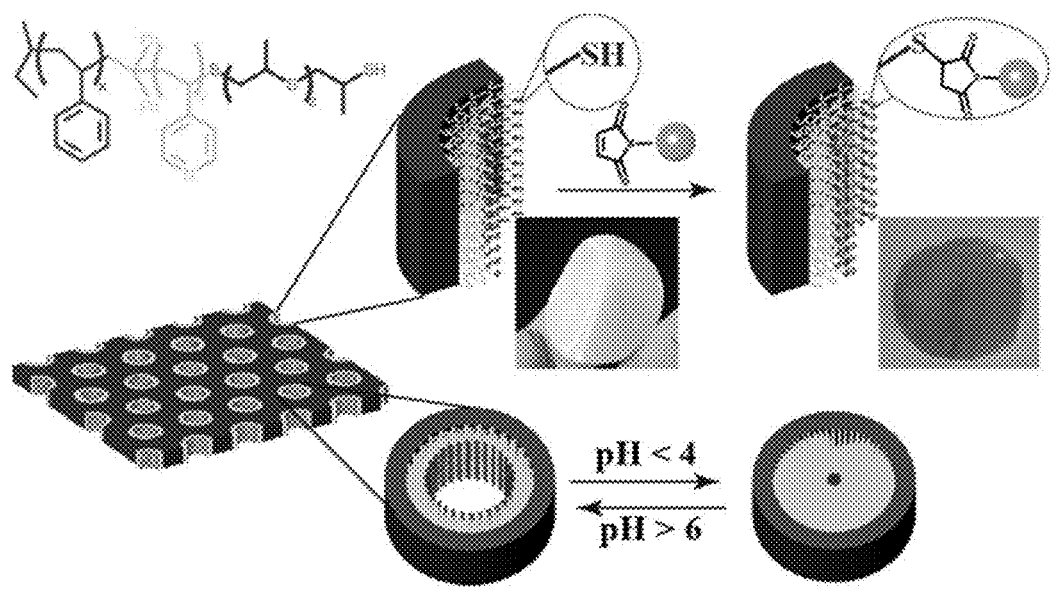
FIG. 14 shows the molecular structure of SVPS triblock terpolymer (upper left), a schematic of a film made from the triblock terpolymer (lower left), schematic and images of membranes with and without pores functionalized with dye (pink, upper right), and a schematic of the pH dependent closure of membrane pores (lower right).
Figure 15:
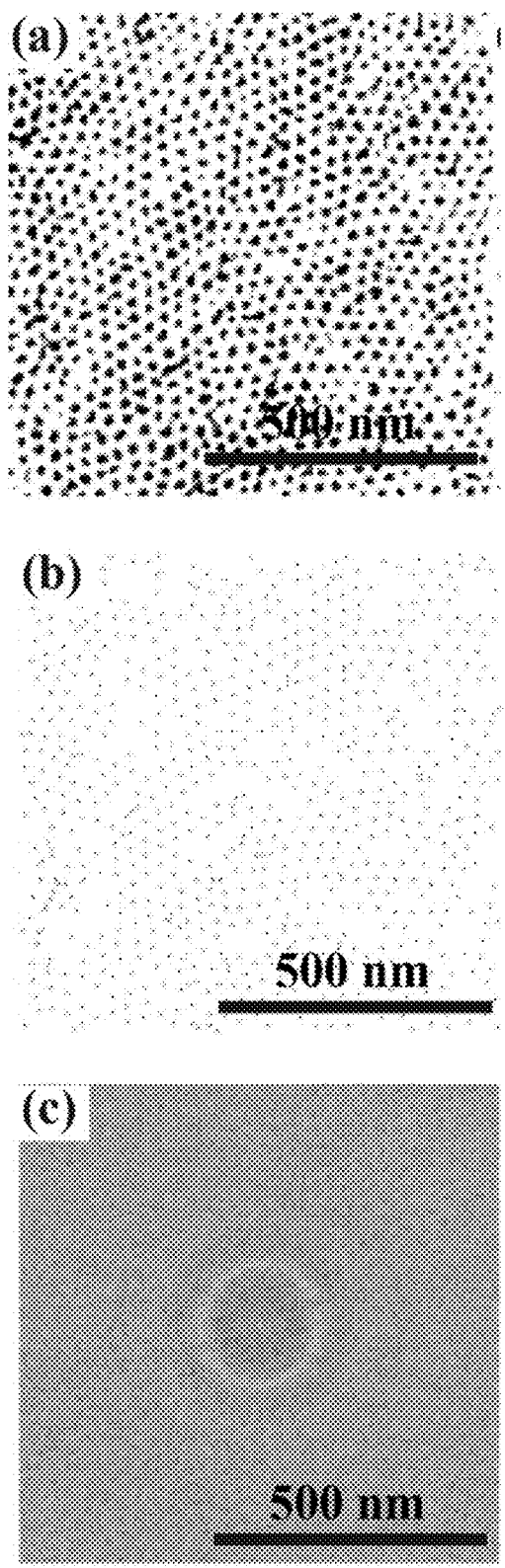
FIG. 15 shows image processing details for FFT of membrane top surface structure using ImageJ. (a) Set threshold between 0-22.08%; (b) Find edges and find maxima; (c) Fast Fourier Transform of (b). Radial profile of FFT is obtained from (c), e.g., see FIG. 5.
Figure 16:
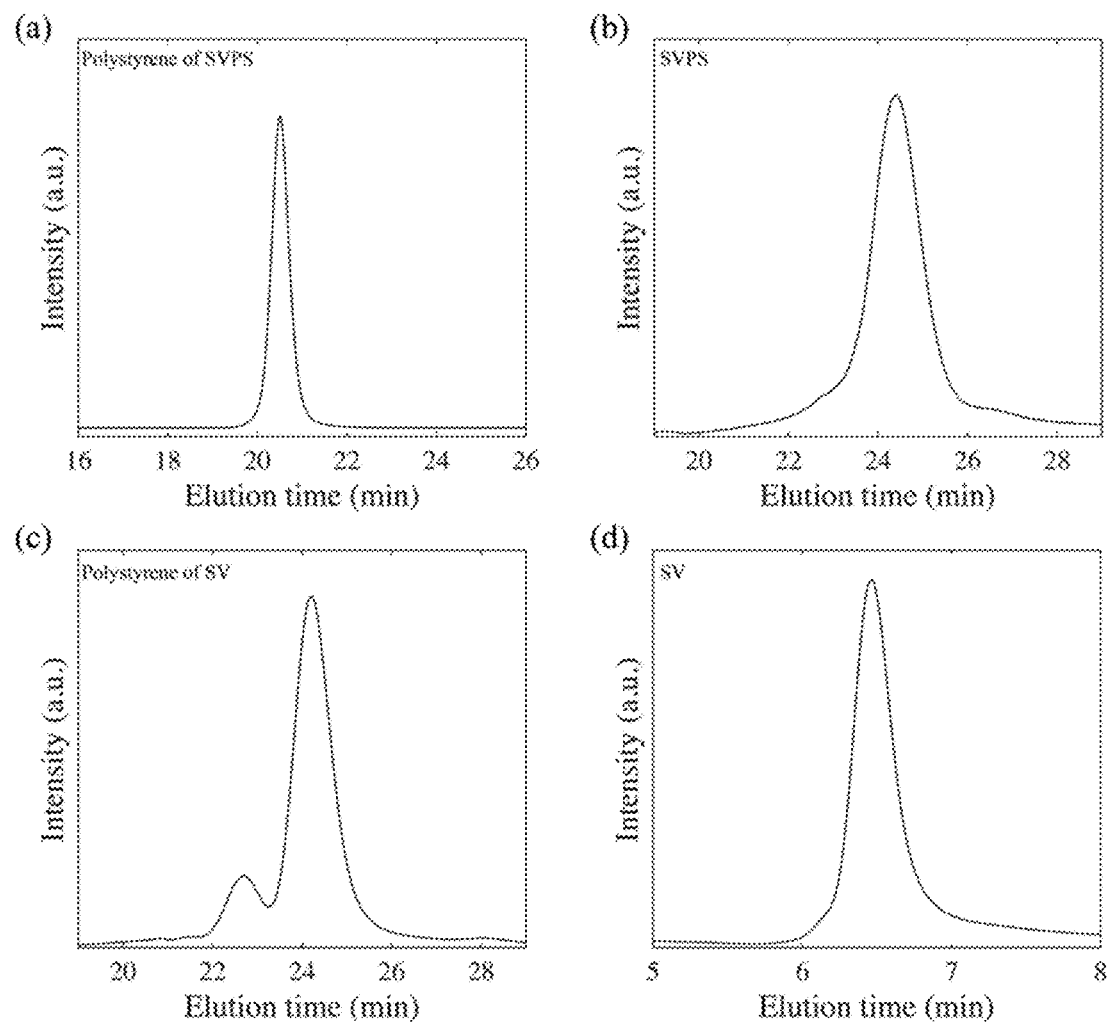
FIG. 16 shows GPC elution curves of terpolymer SVPS and copolymer SV and their parent homopolymer intermediates. (a) Polystyrene of SVPS; The GPC measurement was performed in THF on a Waters ambient-temperature GPC system equipped with a Waters 2410 differential refractive index (RI) detector. (b) SVPS; The GPC measurement was performed in DMF as described in the experimental section. (c) Polystyrene of SV; The GPC measurement was performed in DMF as described in the experimental section. The smaller peak on the left at twice the molar mass of the main peak resulted from dimerization of polystyrene. As the GPC curve of the final SV in (d) showed a monomodal distribution, the dimer peak probably resulted from aliquot sampling for GPC via introduction of oxygen and did not represent the mass distribution of the living polystyrene used for further polymerization with poly(4-vinylpyridine). (d) SV. The GPC measurement was performed in THF on an Agilent 1050 instrument equipped with an Agilent PLgel 5 um Mixed-C column and an Agilent 1100 differential refractive index (RI) detector.
Figure 17:
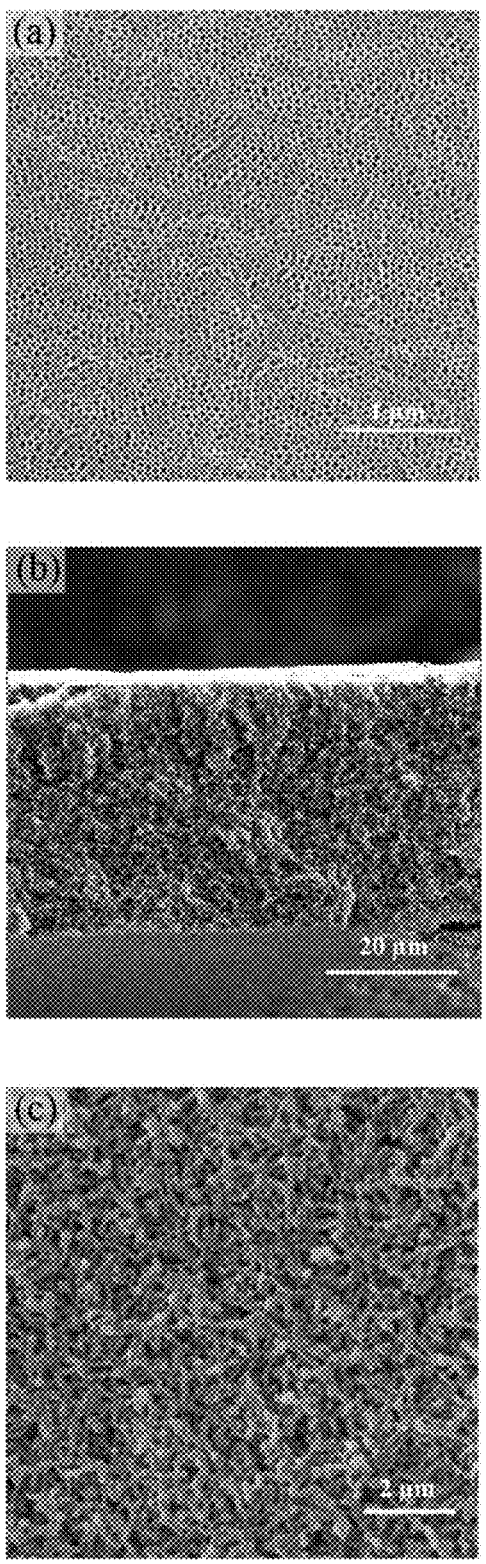
FIG. 17 shows SEM characterization of (a) top surface, (b) cross section, and (c) bottom surface of a SV derived membrane.
Figure 18:
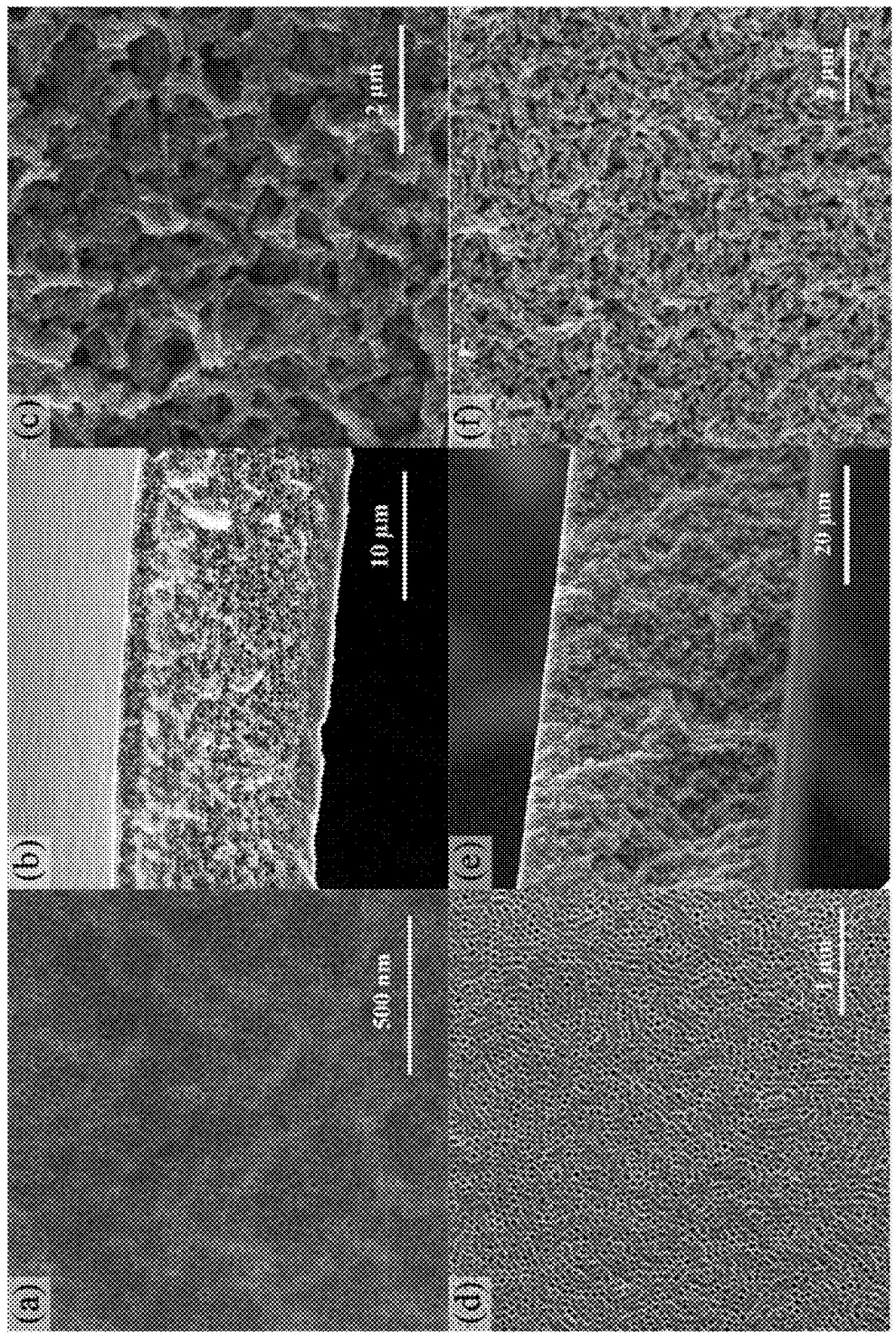
FIG. 18 shows SEM characterization of (a,d) top surfaces, (b,e) cross sections, and (c,f) bottom surfaces of SVPS (a-c) and SV (d-f) derived membranes washed with DMSO.

To prove this assumption, a maleimide-functionalized dye was employed as a targeted model molecule for attachment. To that end thiol-functionalized SVPS membranes and unfunctionalized SV membranes as a control were fabricated via the SNIPS process and compared. Both membranes were soaked in a PBS buffered maleimide-functionalized tetramethyl rhodamine-5 (TMR) dye containing solution for 1 day. After removal from the dye solution, both membranes showed a strong pink color (FIG. 13). Although both membranes showed dye retention after soaking, the mechanism and strength of binding between membrane and target molecule was very different. To demonstrate this difference both pink membranes were soaked in dimethyl sulfoxide (DMSO). DMSO is a good solvent for TMR dye. After the DMSO wash, thiol-functionalized SVPS membrane still retained its pink color while the pink shade of the control SV membrane disappeared almost completely (FIG. 13). SEM characterizations in FIG. 18 confirmed that both membranes remained intact after DMSO wash. Although SV has higher molar mass than SVPS, the two polymers have very similar block fractions and formed identical membrane structures with mesoporous skin layer, sponge-like cross-section and spaghetti-type bottom surface (FIG. 17). SV has a longer hydrophilic P4VP block, which should favor TMR dye association, and SV membranes were almost twice as thick as SVPS membranes (FIG. 18*b,e*). It is therefore unlikely that the ability of SVPS membranes to retain more dye than SV membranes is due to noncovalent interactions or trapping of dye molecules in the membrane structure. Based on these considerations, SV membranes served as a strong control group to confirm that dye retention in SVPS membranes is due to covalent binding. All results suggest that the sulfhydryl groups of the SVPS membrane and the maleimide groups of the dye formed irreversible covalent bonds via click chemistry while the SV membrane only nonspecifically adsorbed dye molecules, which subsequently could be washed out again.

The C—S bonds formed between the membrane terminal —SH groups and dye molecules were hard to quantify by spectroscopic techniques such as e.g. Fourier transform infrared spectroscopy (FTIR) or NMR due to the already existing C—S bonds in the PPS block (e.g. see peaks d and e in the NMR spectrum in FIG. 8*c*). The SVPS studied had an average of 34 propylene sulfide units per macromolecule with each monomer carrying C—S bonds making quantification of the terminal C—S bond formation impossible. Alternatively, in order to further demonstrate and quantify the formation of covalent bonds, Ellman's reagent experiments were conducted on the dye-conjugated SVPS membranes (after DMSO wash) using the same procedure described before. The absorption peak height at 412 nm (FIG. 12, line labelled "dye-conjugated SVPS membrane"), resulting from unconjugated sulfhydryl groups reacting with Ellman's reagents, decreased compared to the peak height of neat SVPS membranes (FIG. 12, line labelled "SVPS membrane"), indicating less free sulfhydryl groups in the dye-conjugated SVPS membranes due to covalent binding with TMR dye (The additional peak at 542 nm resulted from a small quantity of non-specifically adsorbed dye molecules that were not removed by the DMSO rinse and dissolved in the Ellman's reagent solution during membranes soaking). An estimate of the amount of covalent bonds formed between SVPS membrane and TMR dye from these experiments is listed in Table 1 (see paragraph [0175]). According to this estimate 26% of the accessible thiol groups in the membranes formed covalent bonds via sulfhydryl-maleimide click chemistry. Results are again consistent with covalent binding in the functionalized SVPS membrane. SVPS membrane thiol groups are active in buffer solution, which is a mild and compatible environment for proteins and enzymes. This opens pathways in which such biomolecules can be covalently linked to SNIPS membranes via simple immersion in solutions containing such target molecule(s), a process that like the SNIPS process is easily scalable e.g. for industrial use.

Results introduced a triblock terpolymer, SVPS, which forms pH responsive asymmetric ultrafiltration membranes via SNIPS containing covalent binding sites. These covalent binding sites, sulfhydryl functional groups, are introduced via a short third PPS block as confirmed by $^1$H NMR as well as analytic redox reactions. After membrane formation, at least a fraction of the thiol groups remain accessible and active. Quantification experiments prove that functional groups are exposed and accessible on the pore walls and membrane surfaces. By conducting a reaction with maleimide-functionalized dye, it was shown that the binding sites are able to attach target molecules via thiol-ene click chemistry. Sulfhydryl groups are active in various environments such as buffer solutions and organic solvents. This opens a pathway to numerous post-modification reactions with target molecules like proteins and enzymes covalently attached to SNIPS membranes via simple immersion in solutions containing the targets. Like the SNIPS process itself these post-modification reactions are therefore scalable for industrial use. The concepts described here are not limited to sulfhydryl groups. Other functional groups including amines, azide, hydroxyl, alkyne, alkene, or carboxylic groups could be covalently attached to the end group/block of BCPs via anionic polymerization that are subsequently used in the SNIPS process such that the functional groups end up on the pore surface of the top separation layer as well as the substructure. As more types of pore-block end-functionalized membranes emerge, the choice of incorporated receptors/target molecules is expected to expand rapidly. This study therefore lays the foundation for the rapid and simple production of bio-responsive membranes and numerous applications for such multi-functional asymmetric block copolymer membranes.

Example 3

This example provides examples of block copolymers of the present disclosure, examples of methods of making block copolymers of the present disclosure, and films made from block copolymers of the present disclosure.

Three triblock terpolymers, poly(isoprene-b-styrene-b-(4-vinyl)pyridine) (ISV) poly(styrene-b-(4-vinyl)pyridine-b-propylene sulfide) (SVPS) and poly(isoprene-b-styrene-b-ethylene oxide) (ISO) used in this example were synthesized by sequential anionic polymerization. ISV has a molar mass of 138 kg/mol, a polydispersity index of 1.18, and weight fractions of 0.20, 0.67, and 0.13, for the polyisoprene, polystyrene and poly-4-vinylpyridine blocks, respectively. SVPS has a molar mass of 63 kg/mol, a polydispersity index of 1.06, and weight fractions of 0.74, 0.22, and 0.04 for polystyrene, poly(4-vinylpyridine), and poly-(propylene sulfide) blocks, respectively. ISO has a molar mass of 77 kg/mol, a polydispersity index of 1.04, and weight fractions of 0.27, 0.63, and 0.10, for the polyisoprene, polystyrene and poly(ethylene oxide) blocks, respectively. Table 2 summarizes the polymer characterization results.

TABLE 2

| | Molar Mass (kg/mol) | $f_{PI}$ (wt %) | $f_{PS}$ (wt %) | $f_{P4VP}$ (wt %) | $f_{PPS}$ (wt %) | $f_{PEO}$ (wt %) | PDI |
|---|---|---|---|---|---|---|---|
| ISV1 | 138 | 0.20 | 0.67 | 0.13 | — | — | 1.18 |
| SVPS | 63 | — | 0.74 | 0.22 | 0.04 | — | 1.06 |
| ISO | 77 | 0.27 | 0.63 | — | — | 0.1 | 1.04 |

Membranes were fabricated by a hybrid process of block copolymer SNIPS. Three different solutions of 11 wt % ISV, 11 wt % SVPS and 16 wt % ISO were first prepared by dissolving respective triblock terpolymers in the binary solvent system of 1,4-dioxane (DOX) and tetrahydrofuran (THF) in a 7:3 ratio (by weight) (7:3 DOX/THF).

The blended membrane casting solutions contained different ISV:SVPS:ISO weight ratios: 1:1:0, 1:1:0.5, and 1:1:1. Final dope solutions were prepared by mixing appropriate amounts of ISV, SVPS and ISO polymer solutions and allowed to stir for more than 1 h before casting.

The blended dope solutions were cast onto a glass substrate using an automated blade-casting machine. The thin films were evaporated for 80 s. This evaporation period creates a concentration gradient in the film normal direction driving the self-assembly of block copolymers near the top surface to produce the selective skin layer while the bottom structure remains disordered resulting in a sponge-like substructure providing mechanical stability upon plunging into the water precipitation bath.

Figure 19:
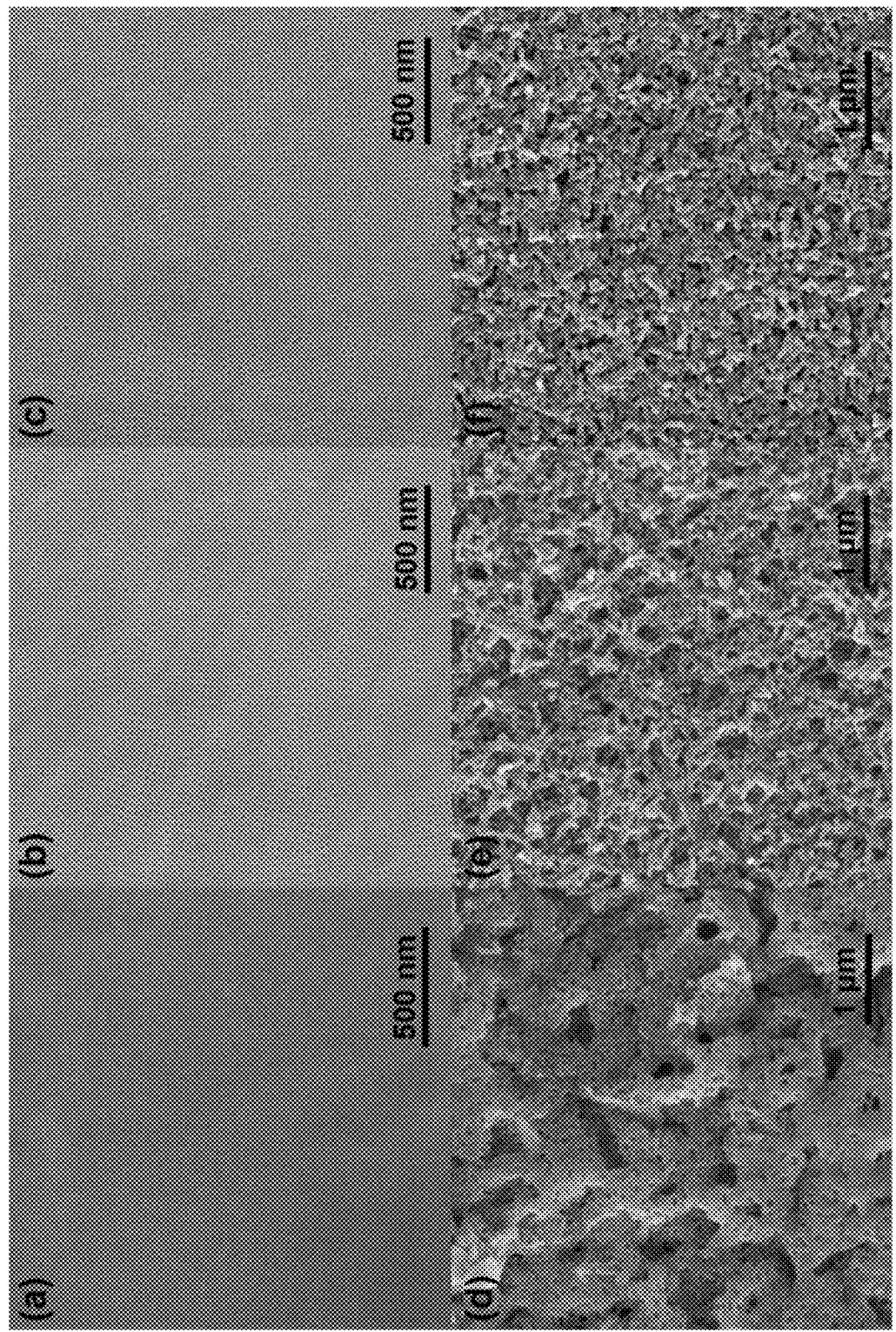
FIG. 19 shows SEM characterization of (a-c) top surfaces and (d-f) bottom surfaces of membranes derived from (a,d) 1:1:0, (b,e) 1:1:0.5 and (c,f) 1:1:1 ISV+SVPS+ISO blends.

SEM characterization of membranes derived from 1:1:0, 1:1:0.5 and 1:1:1 ISV+SVPS+ISO blends are shown in FIG. 19. The top selective layers of all three membranes exhibit dense packed mesopores with narrow pore sizes distribution. Interestingly, the mesopores in 1:1:0 blended membrane packed in a hexagonal pattern, which is a characteristic structure in SVPS membranes. In contrast, in 1:1:0.5 and 1:1:1 blended membranes the pores packed in a 2D square pattern, which resembles pure ISV membrane top surface structure. Bottom surfaces of the three membranes are shown in FIG. 19d-f. Such spaghetti-like substructures with macropores have been observed for pure SVPS membranes (as described herein).

Figure 20:
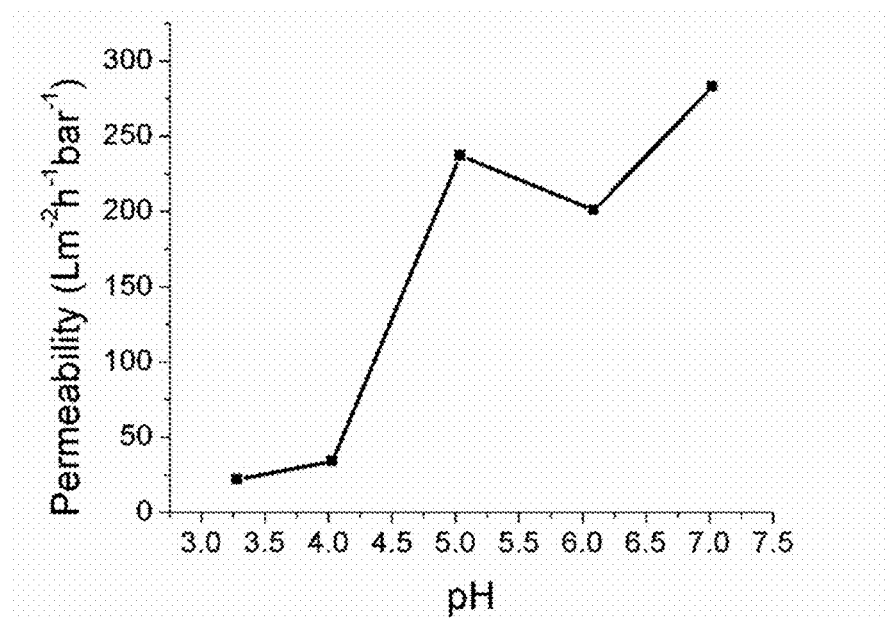
FIG. 20 shows pH responsive behavior of a membrane fabricated from 1:1:1 ISV+SVPS+ISO blended dope solution.

To demonstrate that the specific functionalities provided by each block copolymer component are combined in the blended, now multifunctional, membranes, several performance tests were conducted on these blended membranes. Permeability tests in different pH buffered solutions were performed using a dead-end stir cell. An obvious decrease in flux was observed from pH=5 to pH=4 due to pore closure resulting from P4VP chain protonation and stretching into the pores (FIG. 20) Such pH responsive behavior, which is representative for SNIPS membranes derived from P4VP containing blocks, was provided by both ISV and SVPS components in the blended membrane (as described herein).

Figure 21:
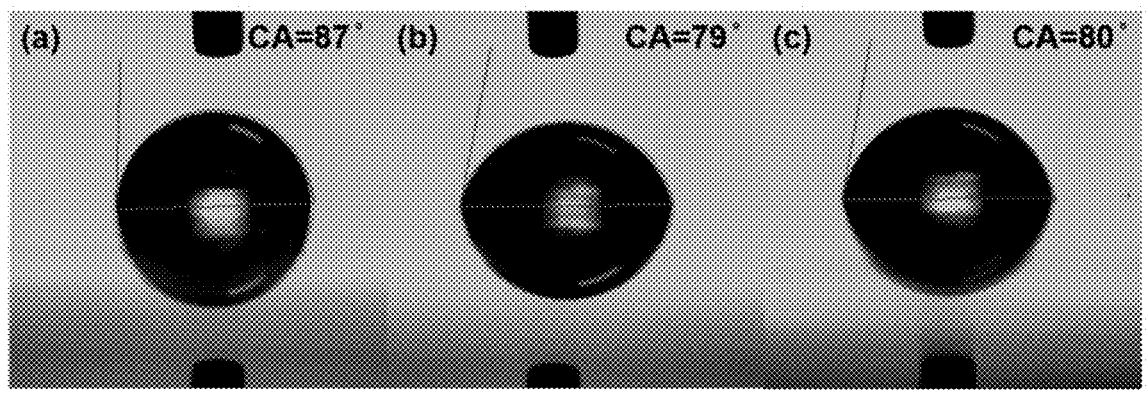
FIG. 21 shows contact angle measurements of SNIPS derived membranes from (a) 1:1:0 (b) 1:1:0.5 and (c) 1:1:1 blends of ISV+SVPS+ISO.

In order to assess the hydrophilicity changes with ISO addition, contact angle measurements were performed on the three membranes fabricated from 1:1:0, 1:1:0.5 and 1:1:1 ISV:SVPS:ISO blended dope solutions. A water droplet of 0.5 µL volume was dispensed on to the top surface of the tested membrane and a photo was taken immediately. The contact angle decreased when the ISO component increased from 0 to 0.5 parts, while the membrane with 1 part ISO has comparable contact angle as the membrane with 0.5 part ISO. (FIG. 21) The blended membranes benefit from ISO addition such that the pore surfaces become more hydrophilic, which is expected to provide the membranes with anti-fouling properties.

Figure 22:
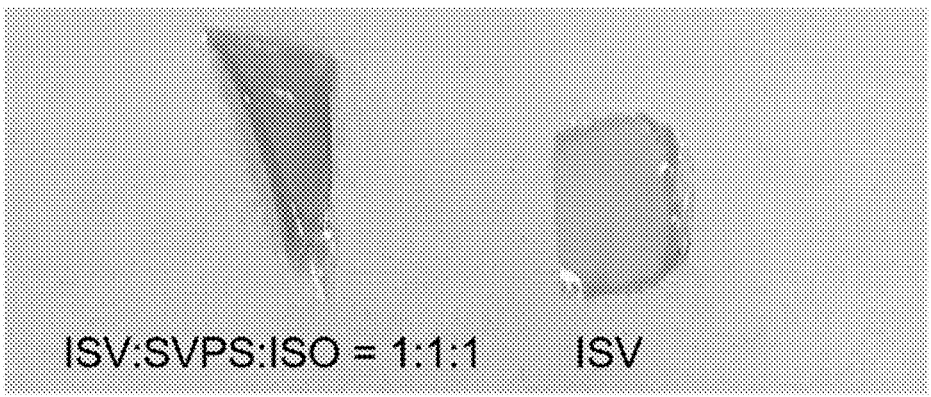
FIG. 22 shows a comparison of functionalized dye conjugation experiments between ISV+SVPS+ISO blended and ISV-only SNIPS derived membranes before and after rinsing in DMSO demonstrating specific dye conjugation in blended membrane.
Figure 22:
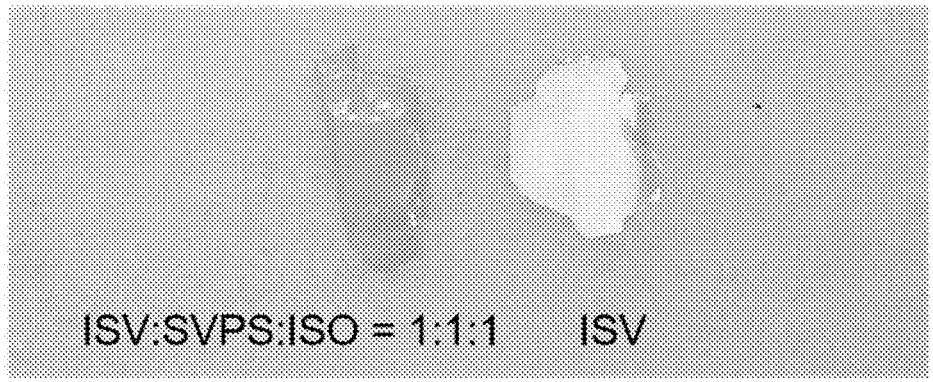

The sulfhydryl groups provided by SVPS should give the blended membrane covalent binding sites. To qualitatively verify this hypothesis, a maleimide functionalized tetramethyl rhodamine-5 (TMR) dye was employed as target molecule. A 1:1:1 blended membrane and an ISV membrane as the control were soaked in a maleimide functionalized TMR dye containing solution overnight. After removal from the dye solution, both membranes showed a pink color (FIG. 22, before DMSO rinse). To remove the non-specifically bonded TMR dye, both pink membranes were rinsed in dimethyl sulfoxide (DMSO). DMSO is a good solvent for TMR dye. After the DMSO wash, the 1:1:1 blended membrane still retained the pink shade while the color of the ISV membrane disappeared almost completely (FIG. 22, after DMSO rinse). This result suggested that the 1:1:1 blended membrane formed covalent bonds with TMR dye while the control ISV membrane could only retain the dye non-covalently. This experiment demonstrated the blended membrane also gained the functionality of covalent binding sites, which is provided by the SVPS terpolymer component.

We presented asymmetric ultrafiltration membranes fabricated from dopes blended with 3 distinct block copolymers, i.e. ISV, SVPS and ISO, using the SNIPS process. The membranes showed well-defined mesoporous top surfaces and combined all the functionalities provided by the 3 individual distinct block copolymer components that went into the blend. The example demonstrated that the blending method can be applied to more than two block copolymers, as well as to block copolymers with rather different block compositions (see Table 2).

Example 4

This example provides examples of block copolymers of the present disclosure, examples of methods of making block copolymers of the present disclosure, and films made from block copolymers of the present disclosure.

Polymer Synthesis and Characterization. The triblock terpolymers poly(isoprene-b-styrene-b-(4-vinyl)pyridine) (ISV) and poly(isoprene-b-styrene-b-ethyleneoxide) (ISO) used in this example were prepared using sequential anionic polymerization technique. The synthesized ISV and ISO had similar molar mass ($M_n$) and volume fractions of polymer blocks (f), which were determined using a combination of gel permeation chromatography (GPC) and $^1$H NMR. Table 3 summarizes the characterization data of the synthesized block copolymers.

TABLE 3

Number average molar mass ($M_n$), volume fraction (f), and polydispersity index (PDI) of the block copolymers used in this study

| Polymer | $M_n$ (kg/mol) | $f_{PI}$ | $f_{PS}$ | f | PDI |
|---|---|---|---|---|---|
| ISV | 164 | 0.25 | 0.65 | 0.10 | 1.17 |
| ISO | 154 | 0.24 | 0.67 | 0.09 | 1.07 |

Membrane fabrication and characterization. Integral asymmetric mesoporous membranes were fabricated using the hybrid process of Self-Assembly and Non-Solvent Induced Phase Separation (SNIPS). The solvent system optimized for the ISV used in this study was chosen to also dissolve ISO into casting solutions.

A ternary solvent mixture of 1,4-dioxane (DOX), tetrahydrofuran (THF) and acetonitrile (MeCN) was used as the solvent system for the block copolymers. The casting solutions were prepared by separately dissolving 11% and 18% of ISV and ISO, respectively, in a solvent system consisting of DOX/THF/MeCN (~67/28/5 wt %) at 300 rpm overnight. The ISV:ISO weight ratios of 9:1, 7:3 and 5:5 were maintained in the individual casting solutions prior to blending. The individual casting solutions containing the desirable blend weight ratios were then mixed and stirred together at 300 rpm for 10 minutes to form a hybrid casting solution.

Solutions were pipetted onto glass substrates and a thin films were casted using an automated blade-casting machine with the gate height set between 203 μm and 229 The solvent was allowed to partially evaporate from the thin films for 120 seconds before plunging the films into a coagulation bath of 18.2 MΩ deionized water. The solvent evaporation step is critical to drive the self-assembly of the triblock terpolymers and is responsible for the thin selective mesoporous skin separation layer atop the macroporous substructure of the resultant asymmetric membranes. The membranes were then separated from the glass substrate and stored in deionized water until tested.

Scanning Electron Microscopy (SEM) micrographs were obtained using a Tescan Mira3 field emission scanning electron microscope (FE-SEM) at an acceleration voltage of 3-5 kV. The membrane samples were dried and sputter coated with gold-palladium using a Denton Vacuum Desk II for 8 seconds prior to imaging.

Membrane Performance Tests. Membranes with an active area of 4.1 cm$^2$ were punched out and pH responsive permeability tests were performed using a dead-end stirred cell (Amicon 8010, Millipore, Co.) connected to a nitrogen gas source. For additional support, the membranes were placed on a 0.2 μm nylon support (Sterlitech) in the cell during testing. pH buffers of sodium acetate and acetic acid were used for pH values in the range of 3-6, while pH buffers of imidazole and hydrochloric acid were used for the 7-8 pH range. The buffer solutions were tested using a pH probe prior to the permeability tests. Three measurements were conducted for each sample at varying trans membrane pressures of 1, 2, and 3 psi and the average values were reported.

Membranes with an area of about 2.01 cm$^2$ were used to determine protein adsorption using a Bradford Assay as previously described in the art. About 1 g/L of both bovine serum albumin (BSA) and γ-globulin (IgG) were prepared in a phosphate buffered saline (PBS) solution (pH~7.5). The membranes were soaked in 3 mL of the protein solution and continuously shaken for 24 hours to allow protein adsorption. Membranes were then immersed in a PBS solution containing no protein and shaken for 10 minutes to remove reversibly attached protein. The absorbance at a wavelength of 595 nm of these two solutions was determined using UV-visible spectroscopy and used to calculate the protein adsorbed onto the membrane. For each protein, three repeats were performed per sample and the average value was reported in μg/cm$^2$.

Figure 23:
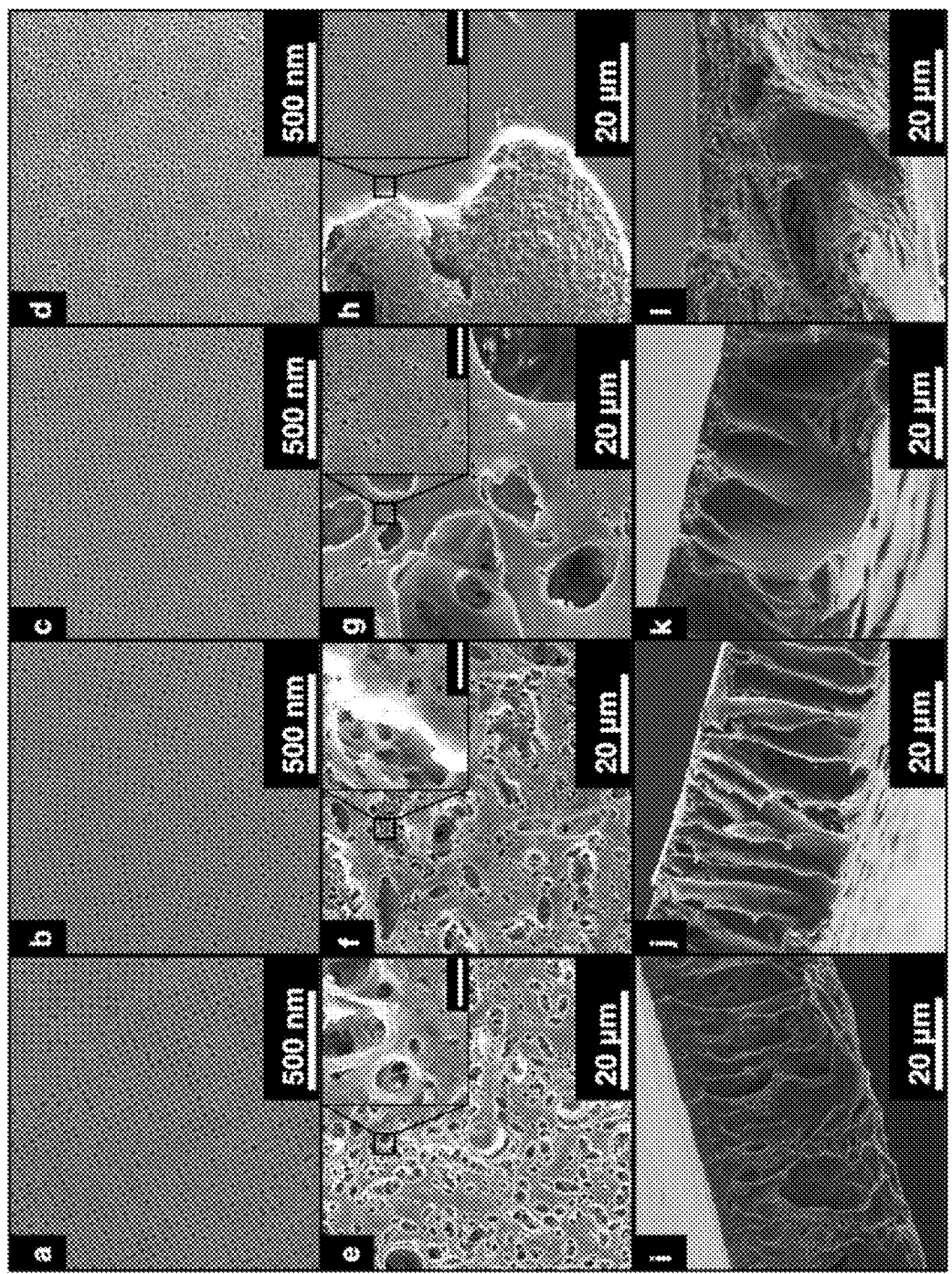
FIG. 23 shows SEM micrographs of the SNIPS membranes. Top surfaces (first row), bottom surfaces and higher magnification images of selected regions (second row and insets respectively), and cross-sectional images (third row) of asymmetric membranes fabricated using (a,e,i) ISV, (b,f,j) 9:1 ISV:ISO blend, (c,g,k) 7:3 ISV:ISO blend, and (d,h,l) 5:5 ISV:ISO blend. Each polymer solution (11% for ISV and 18% for ISO) was prepared in a solvent ratio of DOX/THF/MeCN (67/28/5 wt %). For the blended membrane preparation, solutions of individual polymer components were blended for 10 minutes at 300 rpm before casting. The scale bars for inset images in the second row are 2 μm.

Membrane Characteristics. The top surface, bottom surface, and cross-section of a membrane from pure ISV (FIG. 23a,e,i) is compared to those of blended membranes from ISV:ISO weight ratios of 9:1 (FIG. 23b,f,j), 7:3 (FIG. 23c,g,k) and 5:5 (FIG. 23d,h,i) in the first, second, and third rows of FIG. 23. The pure ISV membrane showed an isoporous top surface with 2D square lattice pore packing. Except for the membrane fabricated from the 5:5 blend, all the other membranes used in this study depicted relatively open bottom surfaces (FIG. 23, second row and insets) and finger-like cross-sections (FIG. 23, third row).

Figure 24:
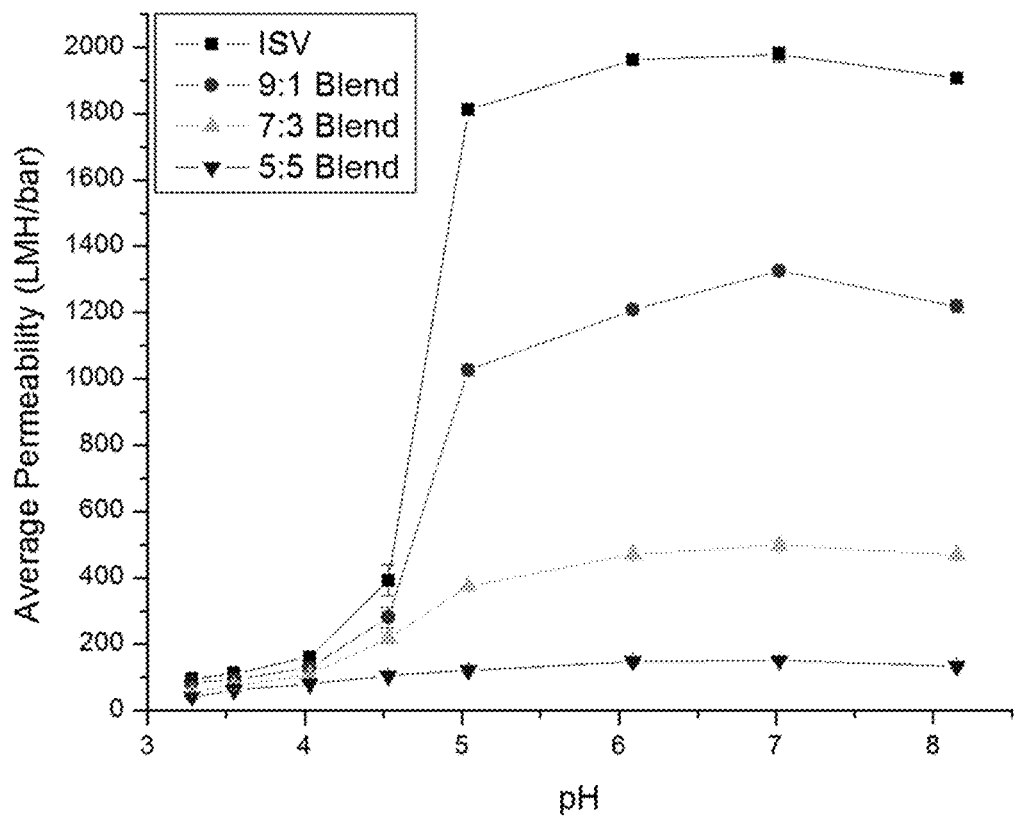
FIG. 24 shows average permeability of pure ISV and blended (9:1, 7:3, 5:5) ISV:ISO membranes as a function of pH of feed solution. Indicated errors are standard deviations from three replicate measurements performed at 1, 2, and 3 psi trans-membrane pressure drop.

Membrane Performance Testing. The hydraulic permeability of the pure and blended membranes as a function of pH of the feed solution was tested. A pressurized dead-end stirred cell was used with 10 mL of buffer feed solutions at varying pH values. For each data point, three values at pressure drops of 1, 2 and 3 psi were measured. The average values of permeability as a function of varying pH of the feed solution are reported in FIG. 24.

In this work, the permeability of pure ISV is ~1800 LMH/bar at pH values 5 and above due to the collapsed structure of P4VP brushes lining the membrane pores. However, at pH values lower than the pK$_a$ of P4VP (4.6), the hydraulic permeability drastically drops. This is due to protonation of P4VP brushes, which extend outward towards the center of the pore and reduce the effective pore size. The flow of feed solution through the membrane pores is thus restricted and leads to a reduced average permeability. For the 9:1 and 7:3 ISV+ISO blended hybrid membranes, this pH responsiveness of the membranes is preserved while for the 5:5 ISV:ISO the pH responsiveness is almost entirely diminished due to the monotonically decreasing amount of pH responsive P4VP disposed on membrane pores.

Figure 25:
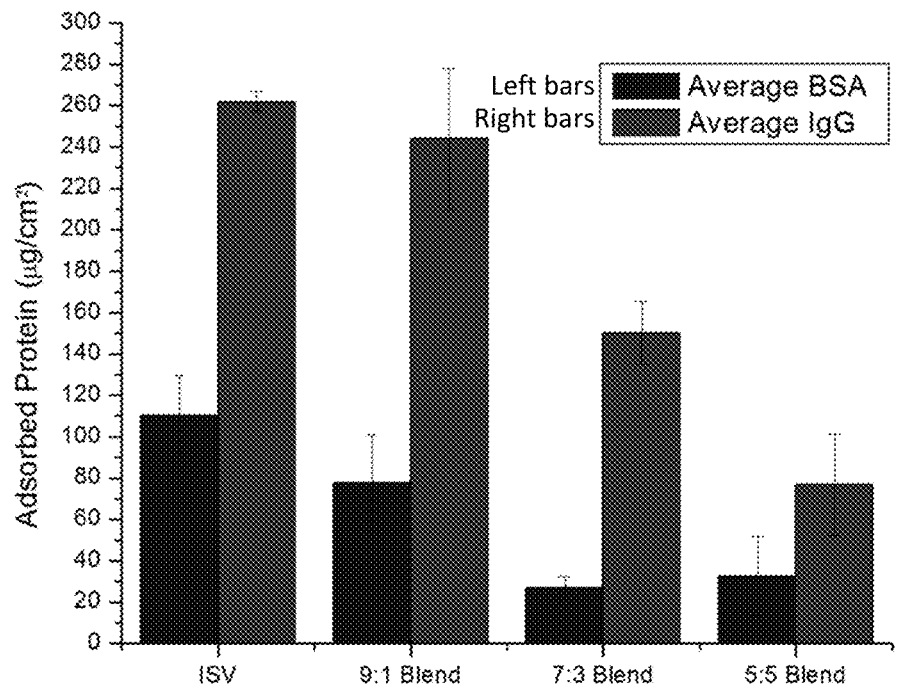
FIG. 25 shows a comparison of BSA (bovine serum albumin) and IgG (γ-globulin) model proteins adsorbed on pure ISV and blended ISV:ISO membranes using the Bradford protein assay.

Protein Adsorption Resistance Testing. The resistance to protein adsorption by pure and hybrid blended membranes was studied. About 1 g/L of two model proteins: bovine serum albumin (BSA) and γ-globulin (IgG) were used to foul the membranes. For each membrane sample, three repeats were performed and the average value was reported in μg/cm$^2$. As seen in FIG. 25, for both BSA and IgG the amount of protein adsorbed decreased as the ratio of ISV to ISO increased. This can be explained by the hydrophilic nature of the PEO block. As more ISO is added to the blended membranes, the hydrophilic character of the membrane surface increases and makes the membrane more resistant to protein adsorption.

These results on the blended ISV and ISO containing membranes suggest that blending of the pH responsive ISV terpolymer with the anti-fouling poly(ethylene oxide) block containing ISO terpolymer can introduce both properties in the resulting membrane via a simple "mixing and matching" approach.

Although the present disclosure has been described with respect to one or more particular embodiments and/or examples, it will be understood that other embodiments and/or examples of the present disclosure may be made without departing from the scope of the present disclosure.

The invention claimed is:

1. A blended film comprising at least two chemically distinct block copolymers, wherein the film comprises:
   i) a surface layer having a thickness of 20 nm to 500 nm,
   ii) a plurality of pores 5 nm to 100 nm in size,
   iii) a pore density of at least 1×1014 pores/m$^2$, and
   iv) an asymmetric hierarchical substructure having a thickness of 5 microns to 500 microns and pores having a size of 5 nm to 100 microns,
   wherein the at least two chemically distinct block copolymers are
   i) poly(isoprene-b-styrene-b-4-vinylpyridine) (ISV) and poly(isoprene-b-styrene-b-dimethylamino ethyl methacrylate) (ISA);
   ii) poly(isoprene-b-styrene-b-4-vinylpyridine) (ISV) and poly(isoprene-b-styrene-b-ethylene oxide) (ISO); or
   iii) poly(isoprene-b-styrene-b-4-vinylpyridine) (ISV), poly(styrene-b-4-vinylpyridine-b-propylene sulfide) (SVPS), and poly(isoprene-b-styrene-b-ethylene oxide) (ISO); and wherein the size of the pores in the surface layer have a pore size distribution of less than 0.3, wherein the pore size distribution is defined as the coefficient of variance, σ/μ, obtained through a lognormal distribution fit.

2. The blended film of claim 1, wherein the film has a thickness of from 5 microns to 500 microns.

3. A blended film comprising at least two chemically distinct block copolymers, wherein the film comprises:
   i) a surface layer having a thickness of 20 nm to 500 nm,
   ii) a plurality of pores 5 nm to 100 nm in size,
   iii) a pore density of at least $1\times10^{14}$ pores/m$^2$, and
   iv) an asymmetric hierarchical substructure having a thickness of 5 microns to 500 microns and pores having a size of 5 nm to 100 microns,
   wherein the size of the pores in the surface layer have a pore size distribution of less than 0.3, wherein the pore size distribution is defined as the coefficient of variance, σ/μ, obtained through a lognormal distribution fit, and
   wherein the film comprises pores having pore walls functionalized with one or more pore functionalizing molecules and individual pore functionalizing molecules are covalently attached to the pore wall via at least one covalent bond to the pore wall.

4. The blended film of claim 3, wherein:
   the at least two chemically distinct block copolymers are selected from the group consisting of diblock copolymers, triblock terpolymers, tetrablock copolymers and combinations thereof; or
   at least one of the at least two chemically distinct block copolymers is a triblock terpolymer or at least two of the at least two structurally distinct block copolymers is a triblock terpolymer.

5. A blended film, comprising at least two chemically distinct block copolymers, wherein the film comprises:
   i) a surface layer having a thickness of 20 nm to 500 nm,
   ii) a plurality of pores 5 nm to 100 nm in size,
   iii) a pore density of at least $1\times10^{14}$ pores/m$^2$, and
   iv) an asymmetric hierarchical substructure having a thickness of 5 microns to 500 microns and pores having a size of 5 nm to 100 microns,
   wherein the film further comprises:
   a homopolymer or small molecule, or
   at least one inorganic material, wherein the inorganic material is disposed on at least a portion of the film, and
   wherein the size of the pores in the surface layer have a pore size distribution of less than 0.3, wherein the pore size distribution is defined as the coefficient of variance, σ/μ, obtained through a lognormal distribution fit.

6. The blended film of claim 5, wherein the inorganic material is a plurality of metal nanoparticles, wherein the metal nanoparticles comprise one or more metals, and/or the inorganic material is a plurality of oxide nanoparticles, wherein the oxide nanoparticles comprise one or more oxides.

7. A device comprising one or more blended film of claim 1.

8. The device of claim 7, wherein the device is a separation device or a filtration device.

9. The blended film of claim 1, wherein:
   the film further comprises pores having pore walls functionalized with one or more pore functionalizing molecules and individual pore functionalizing molecules are covalently attached to the pore wall via at least one covalent bond to the pore wall or
   film further comprises a homopolymer or small molecule or
   the film further comprises at least one inorganic material, wherein the inorganic material is disposed on at least a portion of the film.

10. The blended film of claim 3, wherein:
    the at least two chemically distinct block copolymers are selected from the group consisting of diblock copolymers, triblock terpolymers, tetrablock copolymers and combinations thereof; or
    at least one of the at least two chemically distinct block copolymers is a triblock terpolymer or at least two of the at least two structurally distinct block copolymers is a triblock terpolymer.

11. The blended film of claim 3, wherein the film has a thickness of from 5 microns to 500 microns.

12. The blended film of claim 5, wherein:
    the at least two chemically distinct block copolymers are selected from the group consisting of diblock copolymers, triblock terpolymers, tetrablock copolymers and combinations thereof; or
    at least one of the at least two chemically distinct block copolymers is a triblock terpolymer or at least two of the at least two structurally distinct block copolymers is a triblock terpolymer.

13. The blended film of claim 5, wherein the inorganic material is a plurality of metal nanoparticles, wherein the metal nanoparticles comprise one or more metals, and/or the inorganic material is a plurality of oxide nanoparticles, wherein the oxide nanoparticles comprise one or more oxides.

14. A device comprising one or more blended film of claim 3.

15. The device of claim 14, wherein the device is a separation device or a filtration device.

16. A device comprising one or more blended film of claim 5.

17. The device of claim 16, wherein the device is a separation device or a filtration device.

* * * * *